US011897682B2

(12) United States Patent
Borrero et al.

(10) Patent No.: US 11,897,682 B2
(45) Date of Patent: Feb. 13, 2024

(54) FLEXIBLE PACKAGE

(71) Applicant: The Procter & Gamble Company, Cincinnati, OH (US)

(72) Inventors: Susana E Borrero, Mason, OH (US); Benjamin G Hesford, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 152 days.

(21) Appl. No.: 17/190,452

(22) Filed: Mar. 3, 2021

(65) Prior Publication Data

US 2021/0284420 A1 Sep. 16, 2021

Related U.S. Application Data

(60) Provisional application No. 62/989,135, filed on Mar. 13, 2020.

(51) Int. Cl.

| | |
|---|---|
| ***B65D 81/05*** | (2006.01) |
| ***B31B 70/60*** | (2017.01) |
| *B31B 150/00* | (2017.01) |
| *B31B 170/20* | (2017.01) |

(52) U.S. Cl.
CPC ............ *B65D 81/052* (2013.01); *B31B 70/60* (2017.08); *B31B 2150/00* (2017.08); *B31B 2170/20* (2017.08)

(58) Field of Classification Search
CPC ..... B65D 81/052; B65D 81/051; B65D 81/05
USPC ............................................... 206/522; 383/3
See application file for complete search history.

(56) References Cited

U.S. PATENT DOCUMENTS

| | | | |
|---|---|---|---|
| 2,213,758 A | 9/1940 | Eichberg | |
| 3,030,640 A | 4/1962 | Gosman | |
| 3,346,101 A | 10/1967 | Pestka | |
| 3,349,990 A | 10/1967 | Woodford | |
| 3,777,632 A | 12/1973 | Pepmeier | |
| 3,887,213 A | 6/1975 | Goetz | |
| 3,975,885 A | 8/1976 | Carlisle | |

(Continued)

FOREIGN PATENT DOCUMENTS

| | | |
|---|---|---|
| CN | 1413162 A | 4/2003 |
| CN | 1550422 A | 12/2004 |

(Continued)

OTHER PUBLICATIONS

PCT Search Report and Written Opinion for PCT/US2021/021431 dated May 18, 2021, 6 pages.

(Continued)

*Primary Examiner* — Steven A. Reynolds
(74) *Attorney, Agent, or Firm* — William E. Gallagher; James Ernest Oehlenschlager

(57) ABSTRACT

Package having a flexible inner sheet, a flexible secondary inner sheet, a flexible secondary outer sheet, and an outer sheet. The inner sheet and secondary inner sheet are joined together at least an outer seam and forming one or more primary expansion chambers. The package also has a flexible secondary outer sheet and an outer sheet, joined together at least an outer seam and forming one or more secondary expansion chambers. The secondary outer sheet and the outer sheet also form one or more non-expansion chambers that can be a label surface.

16 Claims, 11 Drawing Sheets

(56) References Cited

U.S. PATENT DOCUMENTS 4,046,314 A 9/1977 Hill
4,087,002 A 5/1978 Bambara et al.
4,190,158 A * 2/1980 Ambrose ............ B65D 81/052 53/433
4,267,684 A * 5/1981 Ambrose ................ B65B 23/00 53/472
4,491,225 A 1/1985 Baillod
4,651,360 A 3/1987 Wang
4,756,032 A 7/1988 Wang
4,872,558 A 10/1989 Pharo
4,889,252 A 12/1989 Rockom et al.
4,969,312 A 11/1990 Pivert
5,140,801 A 8/1992 Wild
5,170,609 A 12/1992 Bullock et al.
5,217,131 A 6/1993 Andrews
5,272,856 A 12/1993 Pharo
5,307,529 A 5/1994 Wang
5,487,470 A 1/1996 Pharo
5,535,888 A 7/1996 De
5,639,523 A 6/1997 Ellis
5,727,270 A 3/1998 Cope et al.
5,769,232 A 6/1998 Cash et al.
5,770,839 A 6/1998 Ruebush et al.
6,139,188 A 10/2000 Marzano
6,520,332 B1 2/2003 Barmore
6,520,333 B1 2/2003 Tschantz
6,520,491 B2 2/2003 Timlick
6,562,740 B1 5/2003 Todt
6,629,777 B2 10/2003 Tanaka et al.
7,165,677 B2 1/2007 Tanaka et al.
7,303,076 B2 12/2007 Scalise
7,383,953 B2 6/2008 Dickinson
7,422,109 B2 9/2008 Yoshifusa
7,631,762 B2 12/2009 Liao et al.
7,913,848 B2 3/2011 Liao et al.
8,157,096 B2 4/2012 Liao
8,540,094 B2 9/2013 Riedl
8,568,029 B2 * 10/2013 Kannankeril ........... B65B 55/20 383/3
8,707,660 B2 4/2014 Howes
8,770,408 B2 7/2014 Tschantz et al.
9,327,867 B2 5/2016 Stanley et al.
9,469,088 B2 10/2016 Stanley
9,623,622 B2 4/2017 Baines
9,694,942 B2 7/2017 Stanley
9,731,885 B2 * 8/2017 Liao ..................... B65D 81/052
9,815,258 B2 11/2017 Stanley
10,040,581 B2 8/2018 Stanley
10,167,128 B2 1/2019 Nevo et al.
11,124,346 B2 9/2021 Borrero et al.
11,338,980 B2 5/2022 Borrero et al.
11,345,532 B2 5/2022 Borrero et al.
11,352,186 B2 6/2022 Lester et al.
11,597,575 B2 3/2023 Borrero et al.
2002/0064319 A1 * 5/2002 Tanaka .................. B65D 33/24 383/3
2003/0006162 A1 1/2003 Smith
2003/0024846 A1 2/2003 Nadler
2003/0034270 A1 2/2003 Ribeiro
2003/0128898 A1 7/2003 Malone et al.
2003/0167572 A1 9/2003 Mileti
2004/0101658 A1 5/2004 Kannankeril
2004/0149618 A1 8/2004 Otaki
2005/0077200 A1 4/2005 Tippey
2005/0103676 A1 5/2005 Lee
2005/0109656 A1 5/2005 Ishizaki
2005/0126941 A1 6/2005 Ferri
2005/0189257 A1 9/2005 Chen et al.
2006/0030471 A1 2/2006 Schaller et al.
2006/0207849 A1 9/2006 Sadow
2007/0092164 A1 4/2007 Yasuhira
2007/0199855 A1 8/2007 Lim
2008/0029423 A1 2/2008 Davlin
2008/0035519 A1 2/2008 Swartz et al.
2008/0083640 A1 4/2008 Liu
2009/0242450 A1 10/2009 Zhang
2010/0072103 A1 * 3/2010 Watanabe ............ B65D 81/052 206/522
2010/0233438 A1 9/2010 Stone
2010/0308062 A1 12/2010 Helou, Jr.
2011/0068154 A1 3/2011 Kannankeril et al.
2011/0187028 A1 8/2011 Menning et al.
2011/0192121 A1 8/2011 Kannankeril
2011/0247725 A1 10/2011 Frayne et al.
2012/0000807 A1 1/2012 Scarbrough et al.
2012/0067760 A1 3/2012 Tschantz et al.
2012/0097634 A1 4/2012 Riedl
2013/0048529 A1 2/2013 Liao et al.
2013/0058218 A1 3/2013 Wu et al.
2013/0292287 A1 11/2013 Stanley et al.
2013/0292353 A1 11/2013 Stanley et al.
2013/0292395 A1 11/2013 Stanley et al.
2013/0292413 A1 11/2013 Stanley et al.
2013/0292415 A1 11/2013 Stanley et al.
2013/0294711 A1 11/2013 Stanley et al.
2013/0313152 A1 11/2013 Liao
2013/0337244 A1 12/2013 Stanley et al.
2014/0033654 A1 2/2014 Stanley et al.
2014/0033655 A1 2/2014 Stanley et al.
2014/0224700 A1 8/2014 Scarbrough et al.
2014/0328551 A1 11/2014 Nevo
2015/0033671 A1 2/2015 Stanley
2015/0034670 A1 2/2015 Stanley et al.
2015/0036950 A1 2/2015 Stanley et al.
2015/0121810 A1 5/2015 Bourgeois et al.
2015/0122373 A1 5/2015 Bourgeois et al.
2015/0122840 A1 5/2015 Cox et al.
2015/0122841 A1 5/2015 McGuire et al.
2015/0122842 A1 5/2015 Berg, Jr. et al.
2015/0122846 A1 5/2015 Stanley et al.
2015/0125099 A1 5/2015 Ishihara et al.
2015/0125574 A1 5/2015 Arent et al.
2015/0126349 A1 5/2015 Ishihara et al.
2015/0259120 A1 9/2015 Liao
2015/0287343 A1 10/2015 Moore
2015/0314940 A1 11/2015 Matta
2016/0058218 A1 3/2016 Yoshifusa
2016/0088981 A1 3/2016 Cameron et al.
2016/0122112 A1 5/2016 Nevo et al.
2016/0176578 A1 6/2016 Stanley et al.
2016/0176582 A1 6/2016 McGuire et al.
2016/0176583 A1 6/2016 Ishihara et al.
2016/0176584 A1 6/2016 Ishihara et al.
2016/0176597 A1 6/2016 Ishihara et al.
2016/0221727 A1 8/2016 Stanley et al.
2016/0297569 A1 10/2016 Berg, Jr. et al.
2016/0297589 A1 10/2016 You et al.
2016/0297590 A1 10/2016 You et al.
2016/0297591 A1 10/2016 You et al.
2016/0325518 A1 11/2016 Ishihara et al.
2016/0362228 A1 12/2016 McGuire et al.
2017/0001782 A1 1/2017 Arent et al.
2017/0121093 A1 5/2017 Liao et al.
2017/0233116 A1 8/2017 Stanley et al.
2017/0247164 A1 8/2017 Zhang
2017/0305609 A1 10/2017 McGuire et al.
2017/0305627 A1 10/2017 Arent et al.
2017/0314283 A1 11/2017 Liu
2018/0036989 A1 2/2018 Baines
2018/0079574 A1 3/2018 Ishihara et al.
2018/0118438 A1 5/2018 Yamamoto et al.
2018/0236741 A1 8/2018 Hargett et al.
2018/0237172 A1 8/2018 Lester et al.
2018/0257836 A1 9/2018 McGuire et al.
2018/0297725 A1 10/2018 Bourgeois et al.
2018/0312283 A1 11/2018 Bourgeois et al.
2018/0312286 A1 11/2018 Lester et al.
2018/0370709 A1 12/2018 Kim
2019/0352033 A1 11/2019 Lester
2020/0024049 A1 1/2020 Borrero
2020/0024050 A1 1/2020 Borrero
2020/0024051 A1 1/2020 Lester
2020/0024053 A1 1/2020 Borrero
2020/0024054 A1 1/2020 Borrero

(56) References Cited

U.S. PATENT DOCUMENTS

| | | | |
|---|---|---|---|
| 2020/0024055 A1 | 1/2020 | Borrero | |
| 2020/0024056 A1 | 1/2020 | Borrero | |
| 2020/0024057 A1 | 1/2020 | Borrero | |
| 2020/0024058 A1 | 1/2020 | Clare | |
| 2021/0291480 A1 | 9/2021 | Opuszko et al. | |
| 2021/0309435 A1 | 10/2021 | Zhang et al. | |

FOREIGN PATENT DOCUMENTS

| | | | |
|---|---|---|---|
| CN | 101357705 | A | 2/2009 |
| CN | 201332783 | Y | 10/2009 |
| CN | 202863950 | U | 4/2013 |
| CN | 104245058 | A | 12/2014 |
| CN | 104284778 | A | 1/2015 |
| CN | 105408226 | A | 3/2016 |
| CN | 206278472 | U | 6/2017 |
| CN | 107107477 | A | 8/2017 |
| CN | 110817123 | A | 2/2020 |
| CN | 111231470 | A | 6/2020 |
| DE | 102012214862 | A1 | 5/2014 |
| EP | 1251080 | A1 | 10/2002 |
| EP | 2014576 | A1 | 1/2009 |
| EP | 2631195 | A1 | 8/2013 |
| EP | 2801537 | A1 | 11/2014 |
| EP | 3575239 | A1 | 12/2019 |
| FR | 2680764 | B1 | 3/1994 |
| GB | 330566 | A | 6/1930 |
| GB | 1403912 | A | 8/1975 |
| GB | 2213464 | A | 8/1989 |
| JP | H05201473 | A | 8/1993 |
| JP | 2001240138 | A | 9/2001 |
| JP | 2003118772 | A | 4/2003 |
| JP | 2011073717 | A | 4/2011 |
| JP | 2017137112 | A | 8/2017 |
| WO | 9601775 | A1 | 1/1996 |
| WO | 9737905 | A1 | 10/1997 |
| WO | 03082699 | A1 | 10/2003 |
| WO | 2004103851 | A1 | 12/2004 |
| WO | 2012073004 | | 6/2012 |
| WO | 2014199368 | A1 | 12/2014 |
| WO | 2015012558 | A1 | 1/2015 |
| WO | 2016078579 | A1 | 5/2016 |
| WO | 2017150857 | A2 | 9/2017 |
| WO | 2018080909 | A1 | 5/2018 |

OTHER PUBLICATIONS

All Office Actions; U.S. Appl. No. 16/515,331, filed Jul. 18, 2019.
All Office Actions; U.S. Appl. No. 16/515,365.
All Office Actions; U.S. Appl. No. 16/515,416.
All Office Actions; U.S. Appl. No. 16/515,887.
All Office Actions; U.S. Appl. No. 16/516,173.
All Office Actions, U.S. Appl. No. 16/515,317.
All Office Actions, U.S. Appl. No. 16/515,507.
All Office Actions, U.S. Appl. No. 16/515,537.
All Office Actions, U.S. Appl. No. 16/516,175.
Campbell, Phillip John, "The Rigidified Standing Pouch—A Concept for Flexible Packaging", A Thesis Written in Partial Fulfillment of the Requirements for the Degree of Master of Industrial Design, North Carolina State University School of Design Raleigh, 1993, pp. 1-35.
PCT Search Report and Written Opinion for PCT/US2019/042353 dated Oct. 21, 2019, 12 pages.
All Office Actions; U.S. Appl. No. 17/684,466, filed Mar. 2, 2022.
All Office Actions; U.S. Appl. No. 17/691,163, filed Mar. 10, 2022.
Unpublished U.S. Appl. No. 17/684,466, filed Mar. 2, 2022, to Susana E. Borrero et al.
Unpublished U.S. Appl. No. 17/691,163, filed Mar. 10, 2022, to Susana E Borrero et al.
All Office Actions; U.S. Appl. No. 17/500,252, filed Oct. 13, 2021.
All Office Actions; U.S. Appl. No. 17/506,026, filed Oct. 20, 2021.
Unpublished U.S. Appl. No. 17/500,252, filed Oct. 13, 2021, to Susana E. Borrero et al.
Unpublished U.S. Appl. No. 17/506,026, filed Oct. 20, 2021, to Joseph Craig Lester et al.

* cited by examiner

FLEXIBLE PACKAGE

FIELD OF THE DISCLOSURE

The present disclosure relates in general to packages, and, in particular, to packages made from one or more flexible materials.

BACKGROUND

E-commerce, or the use of the internet to find and purchase goods, is becoming a very popular way for consumers to shop. The advantages of e-commerce are many including time-savings; competition; shopping at home, work or virtually anywhere; and importantly, the purchaser not having to transport the purchased articles from the location of purchase to the place of use. In the e-commerce system, goods purchased by consumers are generally transported to their homes or places of use by the seller or a service used by the seller. Many e-commerce retailers rely on shipping their goods through the mail, including government mail services and other private and semi-private mail services, or through other parcel or parcel-like delivery services. Such mail and parcel services are typically quite convenient to both the buyer and seller. However, transportation of fragile, heavy and/or bulky goods can be quite expensive due to the cost of the manual labor and materials needed to protect the goods during shipment.

Currently, most shipping packages are some form of flexible pouch (e.g. envelope) made from paper or plastic, or a box, often constructed from corrugated paperboard or cardboard. Although these shipping packages can be used to ship many different types of goods and are reasonably inexpensive, they generally are generic in the sense that they do not provide a custom fit for the products being shipped. This can lead to additional packaging being required to prevent damage to the products being shipped, significant volume being taken up in shipping trucks and warehouses due to the ill-fitting packaging, and difficulty for the consumer to open and/or discard of the shipping packaging. To address the ill-fitting, generic packaging, sellers often stuff the outer shipping packages with dunnage, i.e., some type of material intended to fill the open area not filled by the goods themselves. Alternatively, sellers may employ additional processes to manipulate the products, and/or add protective layers to the product or primary packaging to ensure the product can be safe when placed into generic containers. However, the conventional ways to address the concerns generally add more steps to the process, weight, waste, and cost to the packaging and packing process, and often makes the consumer's experience when opening the package less than desirable (e.g. "packing peanuts" falling out of the package, needing a tool to open the package, etc.). Further, many of the current shipping packages are not weather or environment-resistant and can be damaged by or allow damage to the products being shipped by precipitation, wet surfaces and/or humidity. Accordingly, often such packages are wrapped in additional materials or must be placed in protected locations if they are to be left outside or unattended for any period of time. Further, if packages are used that include inflated or expanded regions, such packages may be shaped such that they are not easily labeled or printed on or such that any indicia or graphics are distorted and/or difficult to read by a human or machine. This can cause difficulties during shipment, warehousing, and inventory and can be less desirable for a consumer.

In addition, packages made of flexible materials such as films and webs often cause problems during shipping and/or handling because they are easily damaged, difficult to transport on conveyor equipment and/or are difficult to stack. Such deficiencies can lead to product and equipment breakage as well as increased costs and time needed for shipping and handling. Further, such flexible packages are typically not shaped in a way to advantageously protect the products therein and/or to provide improved shipping and handling.

As such, it may be desirable to provide a low-cost, convenient, flexible and protective package, that has a flat surface for labeling. It may also be desirable to provide a package that is lighter and produces less waste. These and other benefits may be provided by one or more of the embodiments of the invention described herein.

SUMMARY

In order to address one or more of the above-noted deficiencies, disclosed is a package for one or more articles having an article reservoir, a top surface and a bottom surface. The package has a flexible inner sheet and a flexible secondary inner sheet. The inner sheet and secondary inner sheet are joined together at least an outer seam and form one or more primary expansion chambers adapted to receive a primary expansion material. The package also has a flexible secondary outer sheet and an outer sheet. The secondary outer sheet and the outer sheet are joined together at least an outer seam and form one or more secondary expansion chambers adapted to receive a secondary expansion material. The secondary outer sheet and the outer sheet are joined together to form one or more non-expansion chambers. The one or more non-expansion chambers are provided on the top surface over the one or more primary expansion chambers.

Also disclosed is an expanded package for one or more articles having an article reservoir, a top surface and a bottom surface. The package has a flexible inner sheet and a flexible secondary inner sheet, joined together at least an outer seam and forming one or more primary expansion chambers. The one or more primary expansion chambers are filled with air. The package also has a flexible secondary outer sheet and an outer sheet. The flexible secondary outer sheet and outer sheet are joined together at at least an outer seam and form one or more secondary expansion chambers. The one or more secondary expansion chambers are filled with air. The secondary outer sheet and outer sheet also are joined together to form one or more non-expansion chambers, and the one or more non-expansion chambers are provided on the top surface over the one or more primary expansion chambers.

Still further disclosed is a method of making a package. The method includes the steps of providing a flexible inner sheet and a flexible secondary inner sheet in face-to-face relationship with the inner sheet, providing a flexible secondary outer sheet and an outer sheet in a face-to-face relationship with the secondary outer sheet, joining at least a portion of the secondary inner sheet to the inner sheet to form one or more primary expansion chambers therebetween, joining at least a part of the secondary outer sheet to the outer sheet to form one or more secondary expansion chambers and one or more non-expansion chambers therebetween, and joining the inner sheet, the secondary inner sheet, the secondary outer sheet and the outer sheet at an outer seam to form the package.

These and additional features will be more fully disclosed in the following detailed description in conjunction with the drawings.

BRIEF DESCRIPTION OF THE DRAWINGS

Several figures are provided to help the reader understand the invention. The figures are intended to be viewed in conjunction with the specification and are not intended to be limiting beyond that of the wording of the specification. Reference numbers are used to identify different features of the figures. The same reference numbers are used throughout the specification and drawings to show the same features, regardless of the variation of the invention that is depicted.

DETAILED DESCRIPTION

Figure 1:
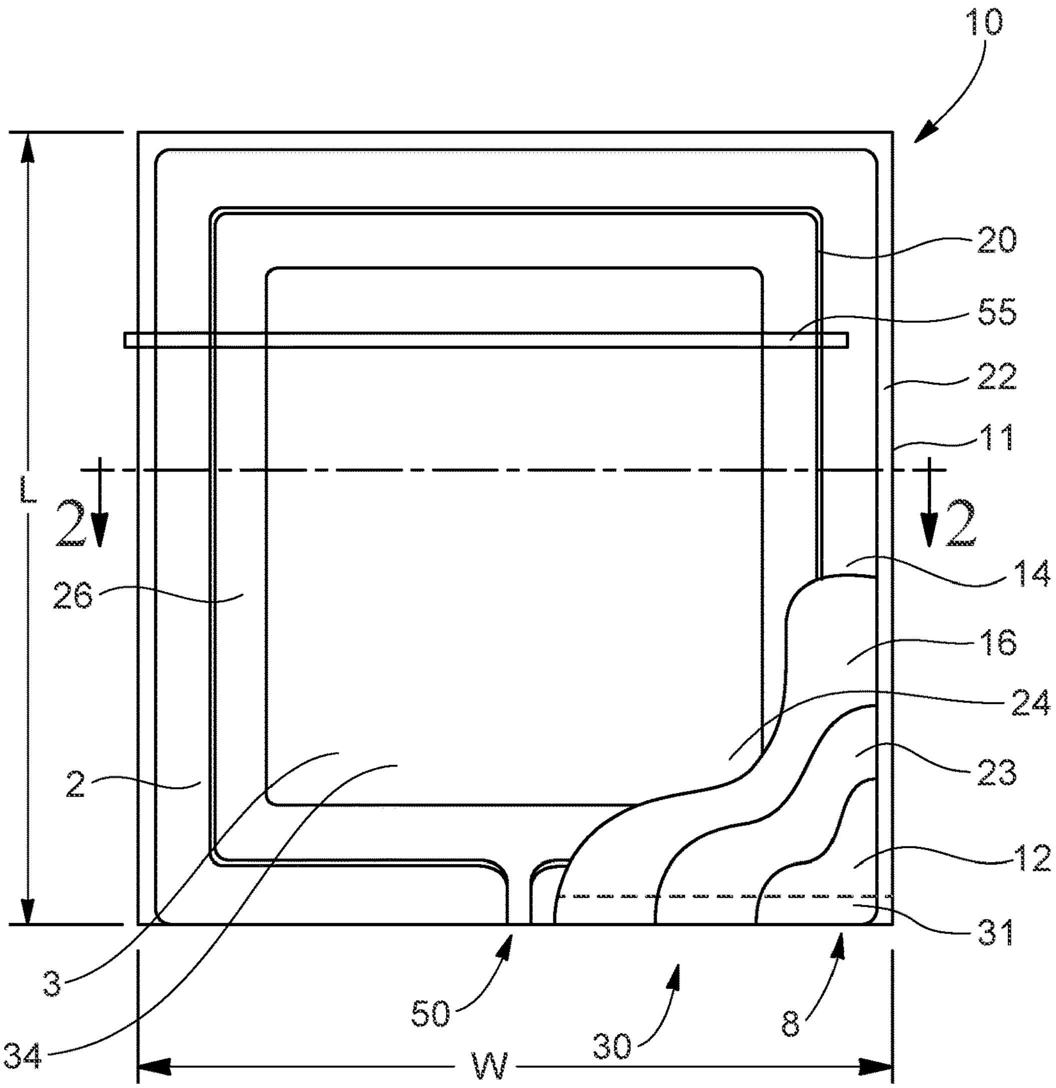
FIG. 1 illustrates a plan view of a flexible package of the type disclosed herein in an unexpanded state.

The present disclosure describes packages, such as primary packages, secondary packages, shipping packages, display packages and/or other packages made from one or more flexible materials. Surprisingly, the present disclosure provides a package that is protective and conveniently shaped, such as, for example, generally in the shape of a box, and although formed from flexible materials and an expansion material such as air, suitable for carrying consumer products and shipping via various transport options. When the consumer receives the package, the consumer can open the package, remove the product, release the expansion material, and deflate the package into a small amount of waste for disposal. The overall shape of the package may include at least one relatively flat portion or “face”. This portion may be useful for applying or printing shipping labels or instructions or other indicia such as logos. The flat portion can have a non-expansion chamber, and the non-expansion chamber can form a pouch. The pouch can contain a label or other information. The packages shown herein provide a top surface that is stretched and suitable for labeling or printing such that the packages can be easily marked with mailing information, logos, or other indicia or information. Although the invention is described and illustrated herein as a shipping package, the disclosure is not intended to limit the scope of the invention to a particular use and the disclosure should be considered applicable to all different types of packages having the disclosed features.

The package can be any suitable shape, such as generally parallelepiped. The overall shape of the package may be substantially a rectangular prism. Such shapes can also provide for better stacking, fit into conventional shipping and handling equipment.

As used herein, the term “ambient conditions” refers to a temperature within the range of 15-35 degrees Celsius and a relative humidity within the range of 35-75%.

As used herein, the term “closed” refers to a state of a package, wherein any products within the package are prevented from escaping the package (e.g. by one or more materials that form a barrier), but the package is not necessarily hermetically sealed. For example, a closed package can include a vent, which allows a head space in the package to be in fluid communication with air in the environment outside of the package.

As used herein, when referring to a flexible package, the terms “disposable” and “single use” refer to packages which, after being used for its intended purpose (e.g. shipping a product to an end user), are not configured to be reused for the same purpose, but are configured to be disposed of (i.e. as waste, compost, and/or recyclable material). Part, parts, or all of any of the flexible packages, disclosed herein, can be configured to be disposable and/or recyclable.

As used herein, when referring to a flexible package, the term “expanded” or “inflated” refers to the state of one or more flexible materials that are configured to change shape when an expansion material is disposed therebetween. An expanded structure has one or more dimensions (e.g. length, width, height, thickness) that is significantly greater than the combined thickness of its one or more flexible materials, before the structure has one or more expansion materials disposed therein. Examples of expansion materials include liquids (e.g. water), gases (e.g. compressed air), fluent products, foams (that can expand after being added into an expansion chamber), co-reactive materials (that produce gas or foam), or phase change materials (that can be added in solid or liquid form, but which turn into a gas; for example, liquid nitrogen or dry ice), or other suitable materials known in the art, or combinations of any of these (e.g. fluent product and liquid nitrogen). Expansion materials can be added at atmospheric pressure, or added under pressure greater than atmospheric pressure, or added to provide a material change that will increase pressure to something above atmospheric pressure. For any of the flexible packages disclosed herein, its one or more flexible materials can be expanded at various points in time with respect to its manufacture, sale, and use. For example, one or more portions of the package may be expanded before or after the product to be shipped in the package is inserted into the package, and/or before or after the flexible package is purchased by an end user.

As used herein, the term “non-expanded” refers to the state of one or more flexible materials that are sealed such that they are configured to not change shape when an expansion material is disposed into the package. A non-expanded structure has one or more dimensions (e.g. length, width, height, thickness) that is substantially the same as the combined thickness of its one or more flexible materials, before the package has one or more expansion materials disposed therein. A non-expanded structure can be sealed apart from adjacent expansion chambers such that expansion material(s) cannot access the non-expansion structure. For example, a non-expansion structure or a non-expansion chamber can be sealed off from the expansion chamber(s) and any expansion ports or valves.

As used herein, the term "flexible shipping package" refers to a flexible package configured to have an article reservoir for containing one or more articles for shipment. Examples of flexible packages can be made from film, woven web, non-woven web, paper, foil or combinations of these and other flexible materials.

As used herein, when referring to a flexible package, the term "flexible material" refers to a thin, easily deformable, sheet-like material, having a flexibility factor within the range of 1,000-2,500,000 N/m. Flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a micro-layered or nanolayered structure, and in any combination, as described herein or as known in the art. For example, a flexible material may be a laminate of a paper to a PVOH material, for example, the laminate can be a laminate of high density polyethlyene with paper on the outside, and the high density polyethylene layers can be the same or different molecular weights, such as, for example, where the highest molecular weight polyethylene layer is on the inner layer. Part, parts, or all of a flexible material can be coated or uncoated, treated or untreated, processed or unprocessed, in any manner known in the art. Parts, parts, or about all, or approximately all, or substantially all, or nearly all, or all of a flexible material can made of sustainable, bio-sourced, recycled, recyclable, compostable, and/or biodegradable material. Part, parts, or about all, or approximately all, or substantially all, or nearly all, or all of any of the flexible materials described herein can be partially or completely translucent, partially or completely transparent, or partially or completely opaque. The flexible materials used to make the packages disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, the term "joined" refers to a configuration wherein elements are either directly connected or indirectly connected.

As used herein, the term "shrinkable material" refers to a material that can reduced in size or contracted (e.g. shrunk) when exposed to a predetermined external stimulus. Examples of shrinkable materials include films made of or including PVC or Polyolefin. Other examples are polymer materials that have been subject to strain prior to implementation in the package such as PET, PLA, polyhydroxyalkanoate and copolymers. Typical stimuli for activating shrinkable materials include light, radiation (including electromagnetic radiation and particle radiation), heat, hot air, water vapor, and humidity, but other stimuli and combinations thereof are contemplated.

As used herein, when referring to a sheet or sheets of flexible material, the term "thickness" refers to a linear dimension measured perpendicular to the outer major surfaces of the sheet, when the sheet is lying flat. The thickness of a package is measured perpendicular to a surface on which the package is placed such that the sheet would be lying flat if the package were not in an expanded state. To compare the thickness of a package in an unexpanded state, an expanded state and a deflated state, the thickness of each should be measured in the same orientation on the same surface. For any of the configurations, the thickness is considered to be the greatest thickness measurement made across the surface or face of the article in that orientation.

As used herein, the term "article reservoir" refers to an enclosable three-dimensional space that is configured to receive and contain one or more articles or products. This three-dimensional space may enclose a volume, the "article reservoir volume". The articles or products may be directly contained by the materials that form the article reservoir. By directly containing the one or more products, the products come into contact with the materials that form the enclosable three-dimensional space, there is no need for an intermediate material or package. Throughout the present disclosure the terms "reservoir" and "article reservoir" are used interchangeably and are intended to have the same meaning. The packages described herein can be configured to have any number of reservoirs. Further, one or more of the reservoirs may be enclosed within another reservoir. Any of the reservoirs disclosed herein can have a reservoir volume of any size. The reservoir(s) can have any shape in any orientation.

As used herein, when referring to a flexible package, the term "expansion chamber" refers to a fillable space made from one or more flexible materials, wherein the space is configured to be at least partially filled with one or more expansion materials, which create tension in the one or more flexible materials, and form an expanded volume.

As used herein, when referring to a flexible package, the term "non-expansion chamber" refers to a space made from one or more flexible materials, where the space is not contiguous with any expansion chamber. A non-expansion chamber cannot be filled with an expansion material. For example, a non-expansion chamber is sealed off from expansion chamber(s) provided in the package.

As used herein, when referring to a flexible package, the term "unexpanded" refers to the state of an expansion chamber, when the chamber does not include an expansion material.

Flexible packages, as described herein, may be used across a variety of industries for a variety of products. For example, flexible packages, as described herein, may be used for shipping across the consumer products industry, including but not limited to the following products: cleaning products, disinfectants, dishwashing compositions, laundry detergents, fabric conditioners, fabric dyes, surface protectants, cosmetics, skin care products, hair treatment products, soaps, body scrubs, exfoliants, astringents, scrubbing lotions, depilatories, antiperspirant compositions, deodorants, shaving products, pre-shaving products, after shaving products, toothpaste, mouthwash, personal care products, baby care products, feminine care products, insect repellants, foods, beverages, electronics, medical devices and goods, pharmaceuticals, supplements, toys, office supplies, household goods, automotive goods, aviation goods, farming goods, clothing, shoes, jewelry, industrial products, and any other items that may be desirable to ship through the mail or other parcel services, etc.

The flexible packages disclosed herein can be configured to have an overall shape. In the unexpanded state, the overall shape may correspond to any known two-dimensional shape including polygons (shapes generally comprised of straight-portions connected by angles), curved-shapes (including circles, ovals, and irregular curved-shapes) and combinations thereof. In the expanded state, the overall shape may correspond with any other known three-dimensional shape, including any kind of polyhedron, any kind of prismatoid, and any kind of prism (including right prisms and uniform prisms).

FIG. 1 illustrates a plan view of the top portion 2 of a flexible package 10 of the type disclosed herein in an unexpanded state. As shown, the package 10 includes an inner sheet 12 and an outer sheet 14. The inner sheet 12 is at least partially joined to the outer sheet 14 at outer seam 22. The package 10, as shown, has a length L, a width W, side edges 11 and opposing ends 6 and 8. The package 10 also includes a secondary inner sheet 23 and a secondary outer sheet 16 at least partially joined to the inner sheet 12 and the outer sheet 14 at outer seam 22. The package 10, as shown, has a non-expansion chamber 34 that provides label region 3 on top portion 2. The package 10 also may include one or more expansion ports 50 to allow a user to direct an expansion material into one or more expansion chambers to expand the package 10, and a closeable opening 30 with a closure mechanism 31. The closable opening allows a user to place one or more articles in the package 10 before shipping. Non-expansion chamber 34 is sealed off from expansion port 50, and upon expansion of package 10 (or inflation of the expansion material is air), non-expansion chamber 34 will not expand and non-expansion chamber 34 provides label region 3 on top portion 2. Label region is flat or substantially flattened and of a sufficient size such that mailing information can be provided directly onto the package, such as by printing or by adding a label directly onto to the label region that can be maintained during the shipping process.

Figure 2:
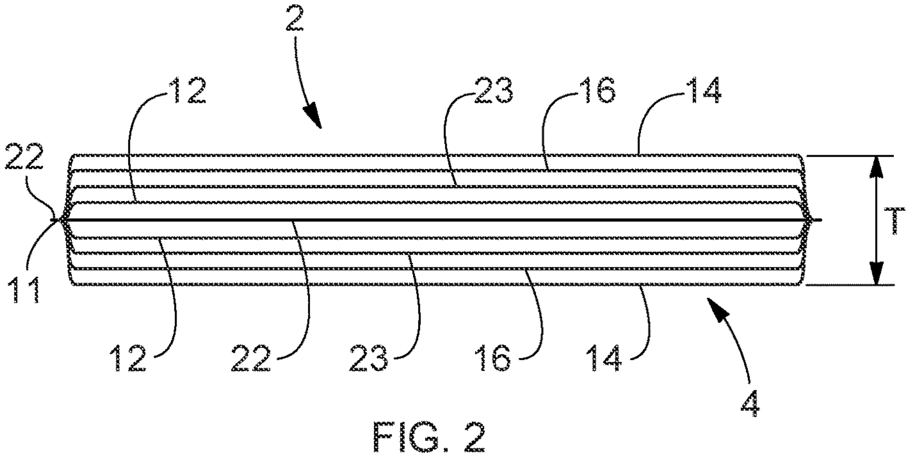
FIG. 2 illustrates a side view of the flexible package of FIG. 1.

FIG. 2 illustrates a side view of the flexible package of FIG. 1. As can be seen, the package may be relatively thin, flat and planar in its non-expanded state. That is, the unexpanded thickness T1 of the package 10 is relatively small when compared to the length L and width W of the package in its unexpanded state or configuration (as shown in FIG. 1), as well as the thickness T2 of the package 10 in an expanded configuration (e.g. FIG. 4). As shown in FIG. 2, the package 10 of FIG. 1 may be constructed from four layers of material that are folded to form a top portion 2 and a bottom portion 4 of the package 10. The top portion 2 is joined to the bottom portion 4 along at least a portion of longitudinal side 11 of the package 10 at one or more outer seams 22. The terms "top" and "bottom" are not intended to be limiting, but rather merely to help more clearly distinguish parts of the package from each other. As such, unless specifically set forth, the terms should not be considered to limit the orientation of the package in any way. The outer seam 22 can take on any desired shape and size and can be formed by any suitable method or material. For example, the outer seam 22 may be formed by glue, heat (e.g. ultrasound, conductive sealing, impulse sealing, ultrasonic sealing, or welding), mechanical crimping, sewing, or by any other known or developed technology for joining sheets of material. While one outer seam 22 is shown in FIG. 2, the package 10 may be constructed with more than one outer seam 22, for example, outer seams 22 formed on two sides, three sides or four sides or more as the shape of the package allows.

Figure 3:
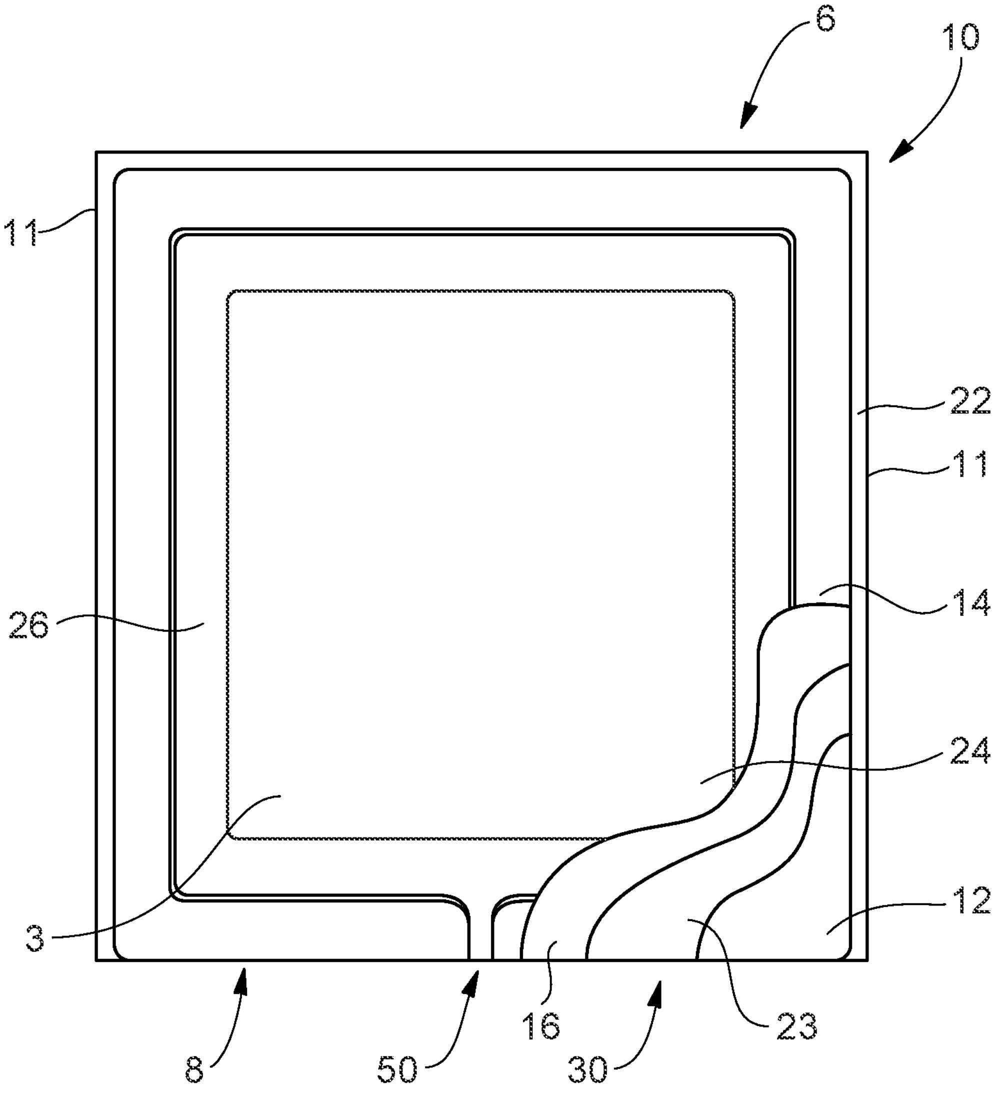
FIG. 3 illustrates a top view of the flexible package of FIG. 1.

FIG. 3 illustrates a plan view of the top portion 4 of the package 10 of FIG. 1. As shown, the top portion 4 has an inner sheet 12, a secondary inner sheet 23, an outer sheet 14, and a secondary outer sheet 16. The inner sheet 12 is at least partly connected to the secondary inner sheet 23 at at least one or more outer seams 22 and forms one or more primary expansion chambers 24 described in more detail, below. The secondary outer sheet 16 may be joined to the outer sheet 14 along at least one or more outer seams 22. As shown in FIG. 3, package 10 has non-expansion chamber 34 that can provide label region 3 on top portion 2.

Figure 4:
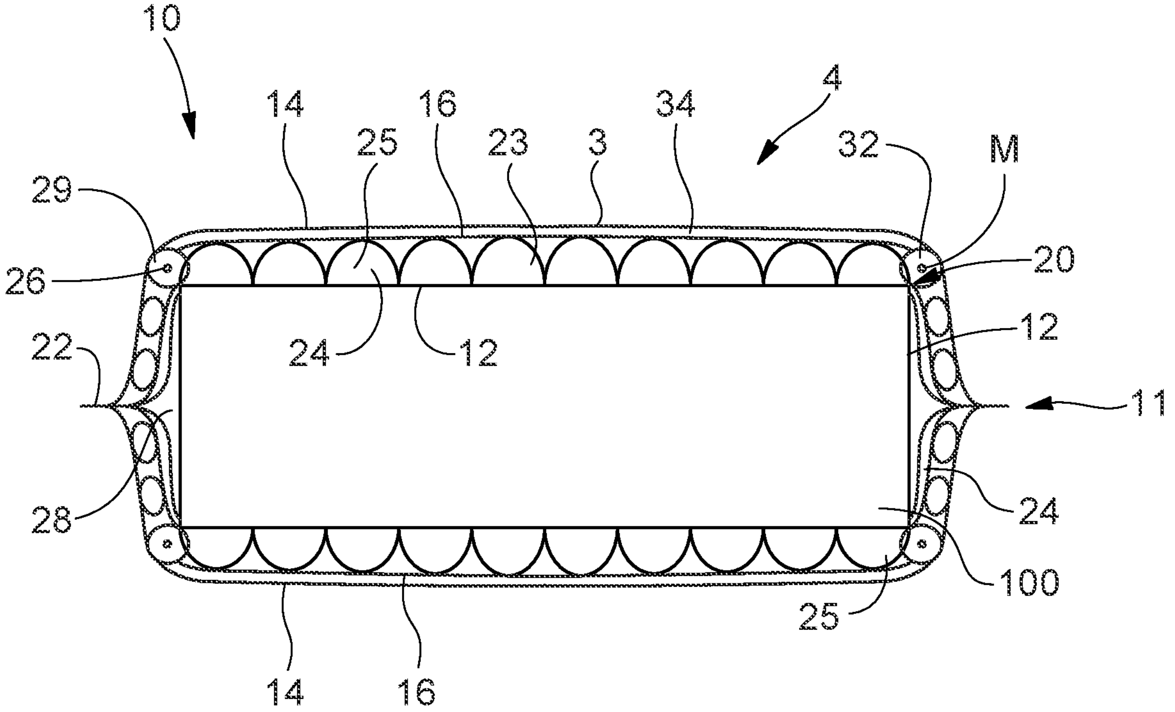
FIG. 4 is cross-sectional view of the flexible package of FIG. 1, as seen through section 2-2, having an article inside the article reservoir, wherein the package is in an expanded state.

FIG. 4 is a cross-sectional view of a flexible package 10 shown in FIG. 1 taken through section 1-1. The package 10 is shown in an expanded state. The package 10 has non-expansion chamber 34 that provides label region 3 on the top portion 4 of package 10. The label region can be any suitable size and will generally be at least large enough to display shipping information, such as for example, a 4 inch by 6-inch standard shipping label. As can be seen, the inner sheet 12 is joined to the secondary inner sheet 23 in at least the area of the outer seam 22. As shown, inner sheet 12 and secondary inner 23 are joined to form one or more primary expansion chambers 24. The primary expansion chamber 24 is in an expanded configuration where an expansion material 25 has been provided into the primary expansion chamber 24. The expansion material 25 increases the spacing between the sheets forming the volume of the primary expansion chamber(s) 24 such that the expanded primary expansion chamber(s) 24 each have a volume that is greater than the primary expansion chamber(s) 24 volume when not filled with the expansion material 25. The primary expansion chamber(s) 24 are inflated to provide structure to the package 10 and to stretch outer sheet 14 and secondary outer sheet 16 such that label region 3 is provided on the top portion 4 of package 10. The primary expansion chamber(s) 24 also may provide structural rigidity, mechanical protection and/or shape to the package 10 when in an expanded configuration. They may also help to restrain any articles placed into the package 10.

Further, as shown in FIG. 4, the secondary outer sheet 16 is joined to the outer sheet 14, the inner sheet 12, and the secondary inner sheet 23, in at least the area of the outer seam 22, and secondary outer sheet 16 and outer sheet 14 are joined to form secondary expansion chamber 26. The secondary expansion chamber 26 is in an expanded configuration where a secondary expansion material 29 has been provided into the secondary expansion chamber 26. The secondary expansion material 29 increases the spacing between the sheets forming the volume of the secondary expansion chamber(s) 26 such that the expanded secondary expansion chamber(s) 26 each have a volume that is greater than the secondary expansion chamber(s) 26 volume when not filled with the secondary expansion material 29. The secondary expansion chamber(s) 26 can provide an outer frame to package 10 and also may provide structural rigidity, mechanical protection, and/or shape to the package 10, when in an expanded configuration. As shown in FIG. 4, the package 10 can be designed such that secondary expansion chambers 26 form supports 32 for the package 10.

The flexible package 10 also may include one or more expansion ports 50 that may be provided to allow a user to direct an expansion material into one or more of the primary expansion chambers 24 and the secondary expansion chambers 26. The primary expansion chambers 24 may be expanded by providing a primary expansion material 25 into the primary expansion chamber 24 such as via expansion port 50. The secondary expansion chambers 26 may be expanded by providing a secondary expansion material 29 into the secondary expansion chamber 26. The secondary expansion material 29 may be the same or a different material than the primary expansion material 25 used to expand the primary expansion chamber(s) 24. If more than one primary expansion chamber 24 is provided, the primary expansion chambers 24 may be independent from each other (e.g. discrete) or in fluid communication with each other, depending on the desired characteristics of the package. If more than one secondary expansion chamber 26 is provided, the secondary expansion chambers 26 may be independent from each other (e.g., discrete) or in fluid communication with each other, depending on the desired characteristics of the package. The primary expansion chambers 24 and secondary expansion chambers 26 may also be independent from each other or in fluid communication with each other, depending on the desired characteristics of the package. The pressures of the primary expansion chambers and the secondary expansion chambers may be the same or may be different.

The package 10 in its expanded configuration has an expanded thickness T2. The expanded thickness T2 is significantly larger than the unexpanded thickness T1. The ability for the package to change size between its unexpanded state and expanded state is one of the reasons why the package of the present invention is unique and advantageous. The package 10 can be manufactured, shipped and stored in an unexpanded state and then expanded only when needed. This allows for significant efficiencies in terms of handling and storing the packages 10 before use. The same is true of the package 10 at the end of the shipping lifecycle. Whether it is intended to be reused or discarded, the package 10 can be deflated from its expanded state to a deflated state. As used herein, the term "deflated" means any pressure from an expansion material that is causing an expansion chamber to expand has been released. A "deflated state" is when the package 10 has been expanded by introduction of an expansion material into one or more expansion chambers, but then the expansion chambers have been opened or otherwise made to be in fluid communication with the surrounding atmosphere and the expansion chambers are all in a state of equilibrium with respect to pressure of the surrounding atmosphere. Any measurements made of a package 10 in a deflated state should be made without any articles 100 in the article reservoir 28 unless otherwise set forth herein.

Figure 5:
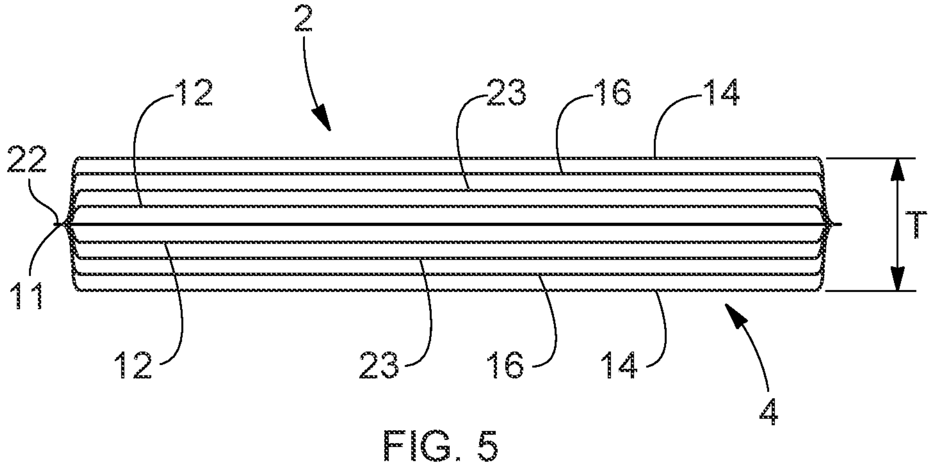
FIG. 5 is a cross-sectional view of the flexible package of FIG. 1, as seen through section 2-2, in a deflated state.

FIG. 5 shows the package of FIGS. 1-4 in its deflated state after the article(s) 100 have been removed. The package 10 has a deflated thickness T3 that can be significantly smaller than the expanded thickness T2. As such, the volume of waste to dispose of related to the package 10 is minimized and/or the package 10 can be stored for later use or shipped to another location for re-use or refurbishment. Although the specific difference between the thicknesses of the package 10 prior to use, during use, and after use will vary depending on the particular package and materials used, the package 10 of the present invention can provide an unexpanded thickness T1 that is less than $1/10^{th}$ of the expanded thickness T2, less than $1/15^{th}$ of the expanded thickness T2, less than $1/20^{th}$ of the expanded thickness T2, less than $1/25^{th}$ of the expanded thickness T2, less than $1/50^{th}$ of the expanded thickness T2 or even less. Similarly, the package 10 of the present invention can provide a deflated thickness T3 that is less than $1/10^{th}$ of the expanded thickness T2, less than $1/15^{th}$ of the expanded thickness T2, less than $1/20^{th}$ of the expanded thickness T2, less than $1/25^{th}$ of the expanded thickness T2 or even less. Further, the package 10 of the present invention can be configured such that the unexpanded thickness T1 and the deflated thickness T3 are both less than $1/15^{th}$ of the expanded thickness T2, less than $1/20^{th}$ of the expanded thickness T2, less than $1/25^{th}$ of the expanded thickness T2, or even less.

As shown in FIG. 4, an article 100 may be located in the space between inner sheets 12. The space between the inner sheets 12 is referred to herein as the article reservoir 28. The article reservoir 28 can be formed between two portions of a single inner sheet 12 or can be formed between two or more different inner sheets 12, depending on the particular configuration of the package 10. The article reservoir 28 is intended to surround at least a portion of one or more articles 100 placed therein. Different shaped packages 10 can be used for different shaped articles 100, different sized articles 100, and/or different numbers of articles 100. However, one of the advantages of the package 10 of the present invention is that a single size and shape of the package can be designed and constructed to fit many different sized articles 100. This is due to the flexible nature of the materials making up the package 10 as well as the fact that portions of the package 10 can be expanded or contracted to snugly fit, for example, inner sheet 12, around the article(s) 100 and even provide for partial or complete immobilization of the article(s) in the package 100. Alternatively, or in addition, a vacuum or partial vacuum can be applied to the article reservoir 28. The vacuum can help bring the inner sheets 12 in contact with the articles 100 and to hold them snugly in place. Removing the air and/or filling the reservoir with a fluid other than air, such as, for example, nitrogen, can provide additional benefits depending on the particular articles 100 being shipped. For example, filling the reservoir 28 with nitrogen can help reduce the negative effects that water vapor and oxygen can have on some items. Of course, other fluids can also be used depending on the items being shipped and the desires of the shipper.

Although the package 10 shown and described with respect to FIG. 4 has four sheets, inner sheet 12, secondary inner sheet 23, outer sheet 14, and secondary outer sheet 16, joined together to form the package 10, any number of sheets can be used depending on the desired end structure of the package 10. Different numbers of sheets could be used to provide additional strength, decoration, protection and/or other characteristics.

Figure 6:
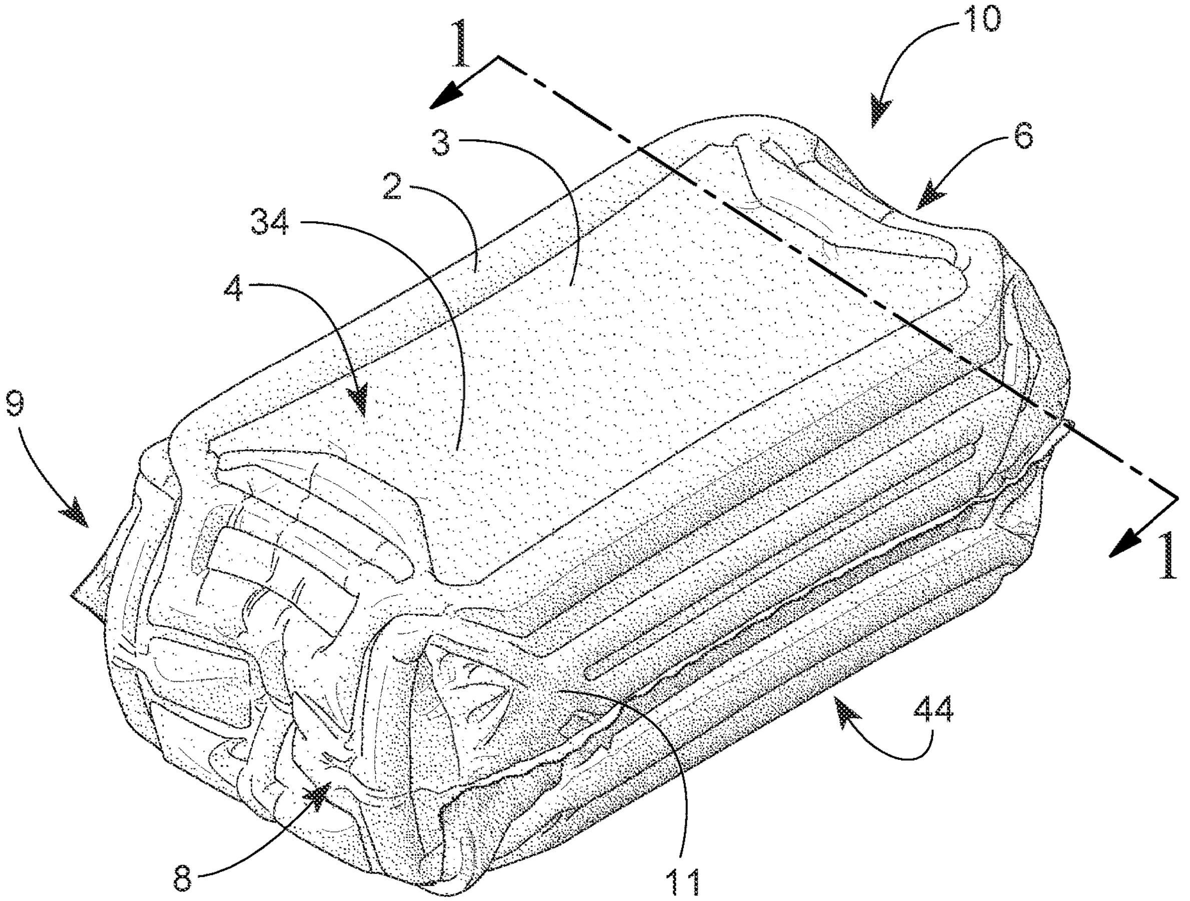
FIG. 6 is a perspective view of a flexible package in the expanded state.

FIG. 6 illustrates a perspective view of a flexible package in the expanded state. The package has a top 2, first side 9, second side 11 opposed to first side 9, first end 6, and second end 8 opposed to first end 6. The first end 6 and the second end 8 each extend between the top 2 and the bottom 4 and the first side 9 and the second side 11. The first side 9 and the second side 11 each extend between the top 2 and the bottom 4 and between the first end 6 and the second end 8. The package 10 has label region 3 on top surface 4. The label region 3 is a stretched region across the primary expansion chamber(s) 24 and corresponds to non-expansion chamber(s) 34. Label region 3 can be provided by any suitable number of non-expansion chambers that are adjacent or contiguous, including one non-expansion chamber 34 or a series of expansion chambers that are arranged to provide the label region 3.

Figure 7:
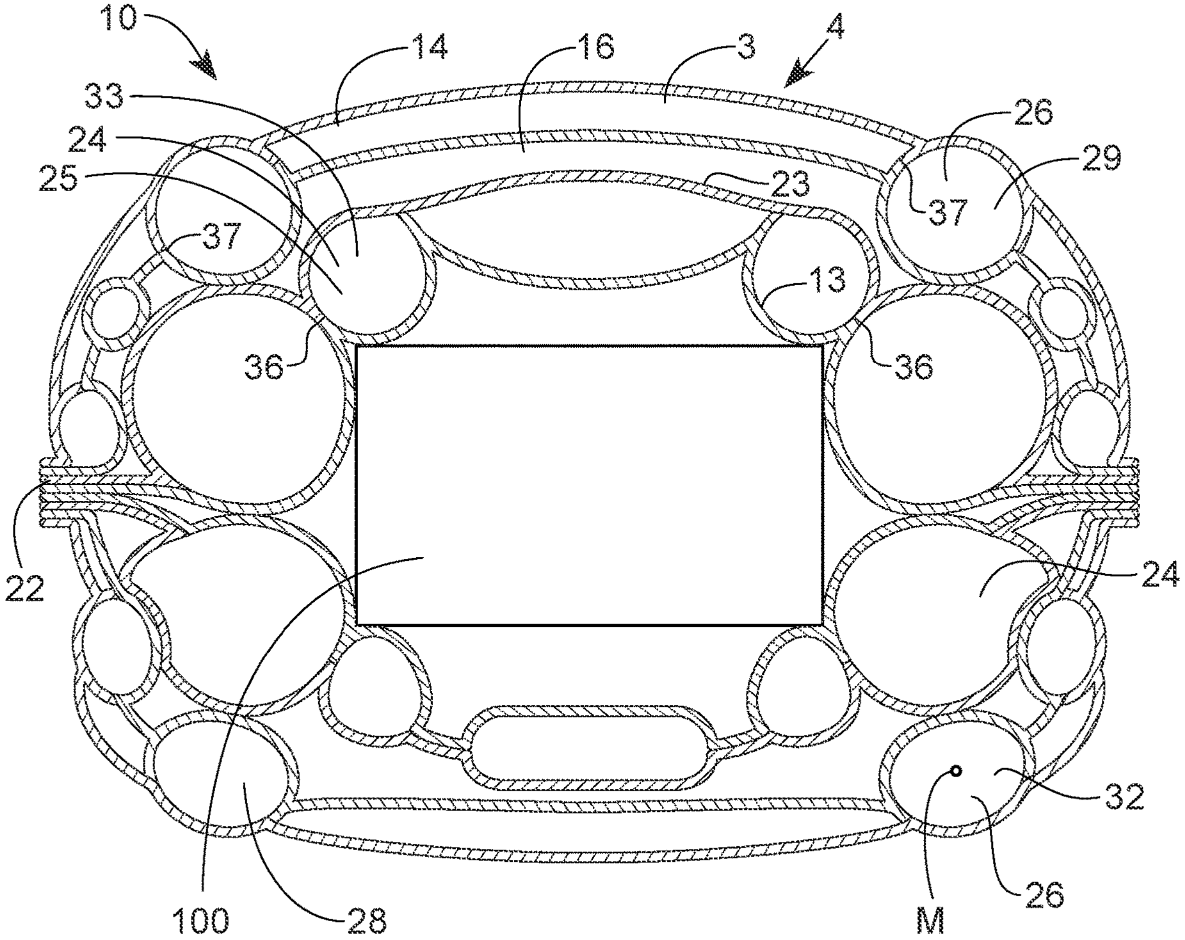
FIG. 7 is a cross-sectional view of the flexible package of FIG. 6, as seen through section 1-1.

As shown in FIGS. 6 and 7, the package 10 can have a stable base 32 onto which it can be placed. One way to ensure that a stable base 32 is provided, for example on top surface 4, is for one or more secondary expansion chambers 26 to surround two or more sides of the label region 3 such that the top surface 4 has stable base 32. The same can be done with the bottom surface 44 or any other panel of the package 10.

As shown in FIG. 7, which is a cross-sectional view of a flexible package 10 along 1-1, the package 10 being in an expanded state and having article 100 therein. Article reservoir 28 is formed by the space between the two facing inner sheets 12. As can be seen, the inner sheet 12 is joined to the secondary inner sheet 23 in at least the area of the outer seam 22. Inner sheet 12 can be joined to the secondary inner sheet 23 at additional seams 36 to form primary expansion chambers 24. The primary expansion chambers 24 are in an expanded configuration where a primary expansion material has been provided into the primary expansion chambers 24. The primary expansion material 25 increases the spacing between the sheets forming the volume of the primary expansion chamber(s) 24 such that the expanded primary expansion chamber(s) 24 each have a volume that is greater than the primary expansion chamber(s) 24 volume when not filled with the primary expansion material 25.

Further, as shown in FIG. 7, the secondary outer sheet 16 may be joined to the outer sheet 14 in at least the area of the outer seam 22. Secondary outer sheet 16 can be joined to the outer sheet 14 at secondary seams 37 to form secondary expansion chambers 26. The secondary expansion chambers 26 may be expanded by providing a secondary expansion material 29 into the secondary expansion chamber 26. The secondary expansion material 29 may be the same or a different material than the primary expansion material 25 used to expand the expansion chamber(s) 24. The secondary outer sheet 16 also is shown as being joined to the outer sheet 14 along the outer seams 22. The secondary outer sheet 16 also may be joined to the inner sheet 12 and the secondary inner sheet 23 in at least the area of the outer seam 22.

The primary expansion chamber(s) 24 are inflated to protect article 100, to provide structure to the package 10, and to stretch outer sheet 14 and secondary outer sheet 16 such that label region 3 is provided on the top portion 4 of package 10. As shown in FIG. 7, the outer sheet 14 and secondary outer sheet 16 are non-bonded in the label region 3, which allows the outer sheet 14 and secondary outer sheet 16 to stretch and provide the label region 3. The primary expansion chamber(s) 24 also may provide structural rigidity, mechanical protection and/or shape to the package 10 when in an expanded configuration. They may also help to restrain any articles 100 placed into the package 10. As shown in FIG. 7, the secondary expansion chamber(s) 26 can provide an outer frame to package 10 and may provide structural rigidity, mechanical protection, and/or shape to the package 10, when in an expanded configuration.

Figure 8:
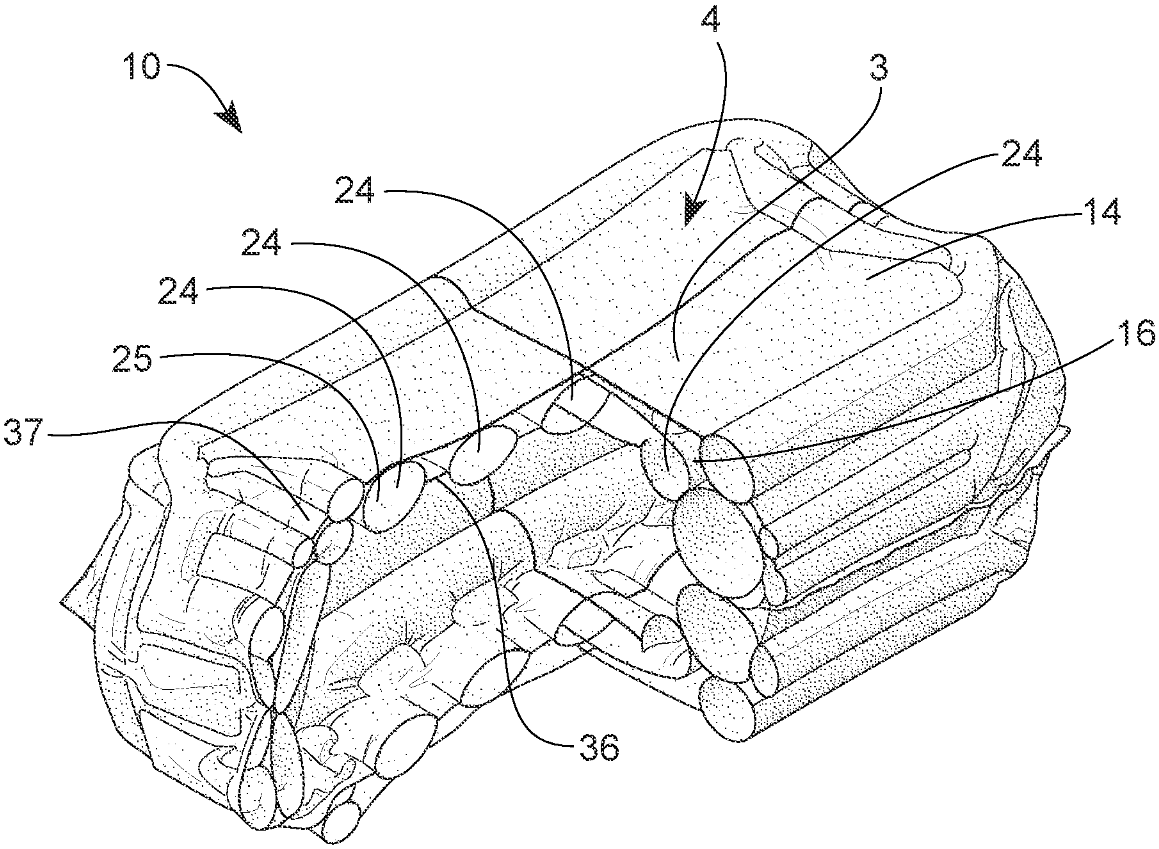
FIG. 8 is a perspective view of the flexible of package of FIG. 6, with a corner cut away.

In addition, as shown in FIGS. 6 and 8, package 10 can include primary expansion chambers 24 on the top portion 4 that are ribs. The ribs serve to both protect the article 100 and to stretch the outer sheet 14 and secondary outer sheet 16 such that label region 3 is provided on the top portion 4 of package 10, as the outer sheet 14 is taut over primary expansion chambers 24. Label region 3 is closed off to primary expansion material(s) 25 and secondary expansion material(s) 29 so that label region 3 is sealed off from expansion and cannot inflate. When primary expansion chambers 24 on the top portion 4 are filled with primary expansion material 25, the outer sheet 14 and secondary outer sheet 16 are stretched in the closed-off and non-bonded region to provide label region 3 on package 10. The primary expansion chamber(s) can be any suitable shape, such as aarectangle, rib, cylinder, frame, square, or other elongated shape, or a series of shapes that form an elongated shape, for example, circles, or ellipses, that can be in series or adjacent such that outer sheet 14 is stretched.

It may be desirable for the pressure in the chambers to be equal or different from each other. Further, where the package 10 includes more than one primary expansion chamber and/or more than one secondary expansion chamber 26, it may be desirable that any one of the one or more primary expansion chambers 24 be expanded to a different pressure than any one or more of the remaining primary expansion chambers and/or one or more of the secondary expansion chambers 26. Adjusting the pressure in different expansion chambers can provide the benefit of strengthening portions of the package (e.g. the expansion chambers that create a frame for the package), but allow for more flexible expansion chambers to be disposed, for example, in contact with the articles 100 in the article reservoir 28. Examples include but are not limited to configurations where the primary expansion chambers 24 have a higher internal pressure than the secondary expansion chambers 26, or vice-versa. Some specific, but non-limiting examples include where at least one of the primary expansion chamber(s) 24 have an internal pressure of from about ambient pressure to about 25 psig, from about 1 psig to about 20 psig, about 2 psig to about 15 psig, about 3 to about 8 psig, or about 3 psig to about 5 psig, and at least one of the secondary expansion chamber(s) 26 have an internal pressure of from about ambient pressure to about 25 psig, from about 1 psig to about 20 psig, about 2 psig to about 15 psig, about 3 psig to about 10 psig, about 4 psig to about 10 psig or about 5 psig to about 10 psig, or about 7 psig to about 9 psig. In one example, one or more of the primary expansion chamber(s) 24 have an internal pressure of between about 2 psig to about 8 psig or about 3 psig to about 5 psig and one or more of the secondary expansion chamber(s) 26 have an internal pressure of between about 5 psig and about 10 psig or about 7 psig to about 9 psig. In another example, one or more of the primary expansion chamber(s) 24 have an internal pressure of between ambient pressure to about 3 psig, or about 1 psig to about 3 psig, and one or more of the secondary expansion chamber(s) 26 have an internal pressure of between ambient pressure to about 25 psig, or about 5 psig to about 15 psig, and the chambers differ in pressure from about 5 psig to about 25 psig. In one example, the one or more of the primary expansion chamber(s) 24 have an internal pressure of between ambient pressure to about 5 psig, or about 1 psig to about 4 psig, or about 3.5 psig, and one or more of the secondary expansion chamber(s) 26 have an internal pressure of between ambient pressure to about 15 psig, or about 5 psig to about 10 psig, or about 8 psig to 9 psig, and the chambers differ in pressure from about 3 psig to about 10 psig. In one example, the one or more of the primary expansion chamber(s) 24 have an internal pressure of between ambient pressure to about 2 psig, and one or more of the secondary expansion chamber(s) 26 have an internal pressure of between ambient pressure to about 15 psig, or about 5 psig to about 15 psig, or about 8 psig to 12 psig, and the chambers differ in pressure from about 3 psig to about 10 psig. The pressure ratio of the average pressure of the one or more primary expansion chamber(s) 24 to the average pressure of the one or more secondary expansion chamber(s) 26 can be any suitable ratio, such as, for example, about 1:15, about 1:10, about 1:8, about 1:5, about 1:3, to about 1:2. In some packages, the pressure of the one or more primary expansion chamber(s) 24 and the pressure of the one or more secondary expansion chamber(s) 26 are both above ambient pressure. In some packages, the pressure of the one or more secondary expansion chamber(s) 26 are above ambient pressure and the one or more primary expansion chamber(s) 24 conforms to the article 100.

Figure 9:
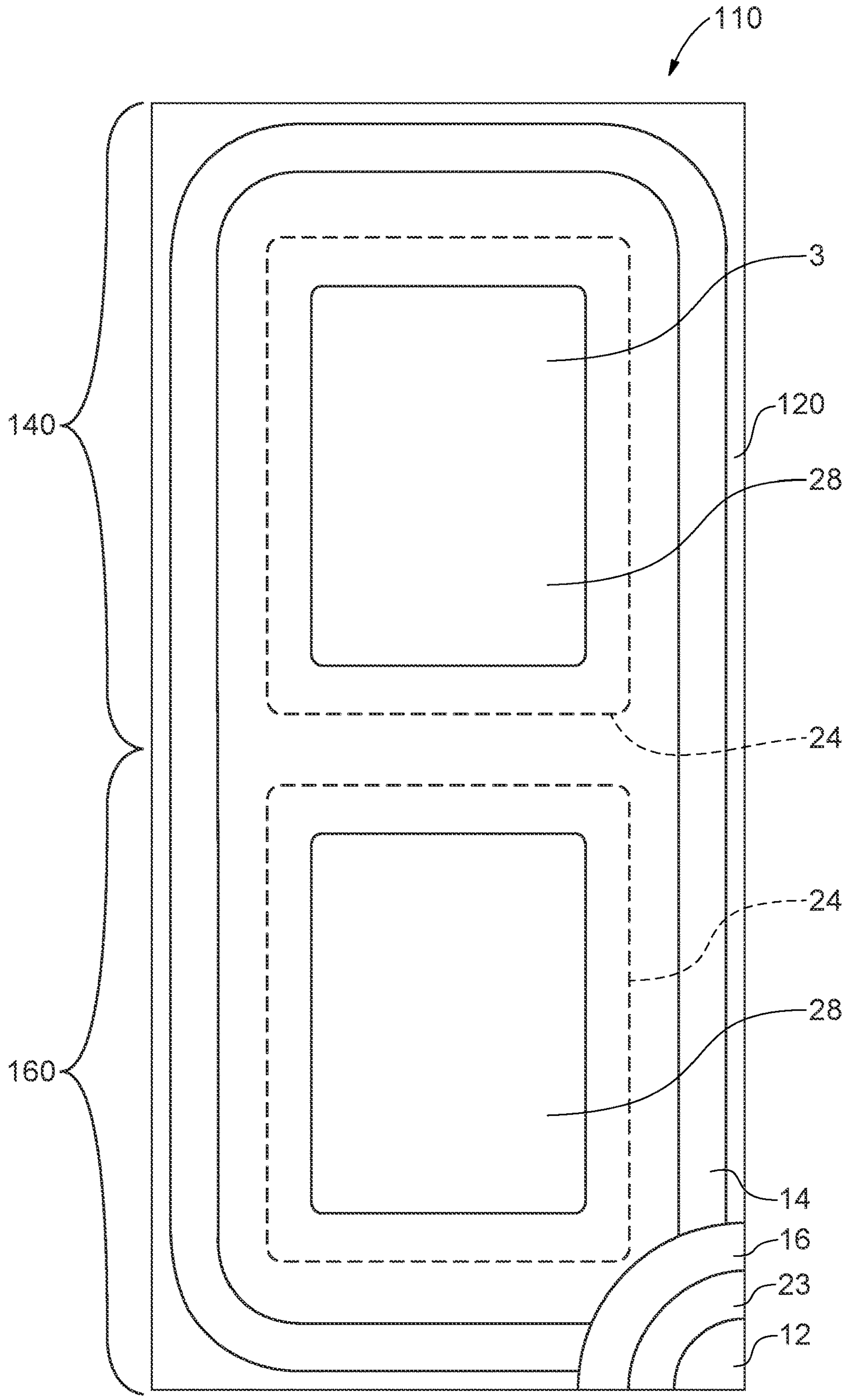
FIG. 9 is a plan view of a blank of a flexible package of the present invention before it is assembled into the final package.

FIG. 9 shows a plan view of a blank of a flexible package before it is assembled into the final package. As shown in FIG. 9, a blank 110 of an example of the flexible package 10 of the present invention is depicted before assembly where the inner sheet 12, the secondary inner sheet 23, the outer sheet 14 and the secondary outer sheet 16 are disposed on top each other to form a four-layer assembly 120. As shown, first sheet portion 140 and second sheet portion 160 are not yet folded upon each other to form the unexpanded package 10. During assembly, the blank 110 is folded such that first sheet portion 140 and second sheet portion 160 are disposed such that the inner sheet 12 of the first sheet portion is facing and disposed adjacent to the inner sheet 12 of the second sheet portion. After being folded, the first sheet portion 140 and the second sheet portion 160 are joined together at at least outer seams 22, as shown in FIG. 9. The outer seam 22 joins the first and second portions 140 and 160 to one another, thereby forming the package 10 having article reservoir 28. The article reservoir 28 is therefore enclosed by the outer seam 22 between the inner sheet 12 of the first and second sheet portions 140 and 160. Blank 110 can contain primary expansion chamber seams 20 and secondary expansion chamber seams 27 to create primary expansion chambers 24 and secondary expansion chambers 26. Blank 110 also has non-expansion chamber 34 which forms the label region 3 of package 10, as shown in expanded form in FIG. 7. The inner sheet 12 and secondary inner sheet 23 may be bonded underneath the label region 3, for example to form ribs 33 or other primary expansion chambers 24 that stretch the non-expansion chamber 34 to form label region 3 of package 10. As shown in FIG. 9, the secondary expansion chamber 24 is larger in length and/or width or both than the non-expansion chamber 34 to form label region 3. For example, when package 10 is in expanded form, the region of package 10 that has label region 3, such as the top 4, can have a non-expansion chamber 34 having a length and a width, and a secondary expansion chamber 24 that has a length and a width, and the length and the width of the secondary expansion chamber 24 are greater than the length and the width of the non-expansion chamber 34. Also, as shown in FIG. 7, when package 10 is expanded the secondary expansion chamber 24 is disposed underneath the non-expansion chamber 34. The secondary expansion chamber(s) 24 can cover and exceed the entire width and the entire length of the non-expansion chamber 34 that forms the label region 3.

The inner sheet 12, the secondary inner sheet 23, the outer sheet 14 and/or the secondary outer sheet 16 can be joined to each other in any number of places (except for where the outer sheet 14 and secondary outer sheet 16 where applicable are non-bonded in the label region 3) creating any number, shape and size of expansion chambers. The primary and/or secondary expansion chamber seams can be of any length, width and shape. The primary and/or secondary expansion chamber seams can be formed by any suitable method or material. For example, the seams may be formed by glue, heat (e.g. ultrasound, conductive sealing, impulse sealing, ultrasonic sealing, or welding), mechanical crimping, sewing, or by any other known or developed technology for joining sheets of material. The seams can be continuous or intermittent, can be straight or curved, and can be permanent or temporary. The shape of the seams can be used to form the shape of the expansion chambers alone or in addition to other structural elements. For example, the secondary expansion chambers can be shaped by the secondary expansion chamber seams in combination with additional materials disposed within the secondary chambers or joined thereto. Further, chambers can be shaped by the use of chemical or mechanical modifications to the materials forming the sheets. For example, a portion of the inner sheet, secondary inner sheet, outer sheet and/or secondary outer sheet may be heated, ring-rolled, chemically treated or modified to make it more or less flexible, extensible, non-extensible, stronger, weaker, shorter, or longer than prior to treatment.

The expansion chamber(s) can have various shapes and sizes. Part, parts, or about all, or approximately all, or substantially all, or nearly all, or all of the expansion chamber(s) can be straight, curved, angled, segmented, or other shapes, or combinations of any of these shapes. Part, parts, or about all, or approximately all, or substantially all, or nearly all, or all of an expansion chamber can have any suitable cross-sectional shape, such as circular, oval, square, triangular, star-shaped, or modified versions of these shapes, or other shapes, or combinations of any of these shapes. An expansion chamber can have an overall shape that is tubular, or convex, or concave, along part, parts, or about all, or approximately all, or substantially all, or nearly all, or all of a length. An expansion chamber can have any suitable cross-sectional area, any suitable overall width, and any suitable overall length. An expansion chamber can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of an expansion chamber can increase or decrease along part, parts, or all of its length.

The flexible package 10 may include one or more expansion ports 50. The expansion port 50 may be an opening between layers of the materials forming the package 10 or may be an opening in any one or more layers that provides fluid communication to one or more of the expansion chambers 24, 26. In one example, a portion of the inner sheet 12 and the outer sheet 14 remain unjoined to allow the user to introduce an expansion material into the expansion chamber 24. Additionally, or alternatively, materials or structures can be placed in desired locations between the sheets to provide the expansion port 50. For example, a valve may be located between two of the sheets before or after they are joined to provide the expansion port 50 through which an expansion material may be introduced into one or more of the expansion chambers 24, 26.

Any one or more expansion ports 50 may be in fluid communication with any one or more expansion chambers 24, 26 and multiple expansion ports 50 may be in fluid communication with any one or more expansion chambers 24, 26. For example, it may be desirable for a single expansion port 50 to allow for introduction of an expansion material into all of the expansion chambers 24, 26 in the package 10. It may also be desirable for a single expansion port 50 to allow for introduction of an expansion material into only some of the expansion chambers 24, 26 in the package 10, such as for example those on one side of the package 10 or those formed between only the same sheets (e.g. inner sheet 12 and outer sheet 14). Further still, several expansion chambers 24, 26 may have different expansion ports 50 to allow for individual expansion of the chambers 24, 26. Individual expansion can be beneficial when different expansion pressures are desired for different expansion chambers 24, 26 and/or if the expansion chambers 24, 26 will be expanded at different times or with different equipment.

Typically, after the user introduces the expansion material through the expansion port 50, the expansion port is temporarily or permanently closed to prevent the escape of the expansion material(s) from the expanded chamber(s) 24, 26. A pressure source may remain in fluid communication with the expanded chamber 24, 26 throughout an operation that closes the expansion port 50 to help maintain the desired pressure in the expansion chamber 24, 26. Any means can be used to close the expansion port, including those described herein with respect to making chamber seams 20 and 27 as well as any other method suitable for closing the particular expansion port 50 that is used. The expansion port 50 may be hermetically sealed closed or not, depending on the desired end use of the package 10. Further, the expansion port 50 may include a closure other than a seal, such as, for example, a valve, a cap, a material to hold the expansion port 50 closed, such as an adhesive, or any other closure or closure means. The closure may be single use (e.g. once closed, can't be opened without damaging the package 10, expansion port 50 or closure, or may be reusable, such as a threaded cap or friction-fit plug or other closure that can be reused one or more times.

In any configuration, it may be desirable to include one or more vents 21 in fluid communication with the article reservoir 28 to allow the vacuum to be applied and/or to allow fluid to escape the article reservoir 28 during or after the expansion of the primary expansion chamber(s) 24. The vent 21 can be sealed after the package is fully constructed or it can remain partially or fully open to allow for fluid flow into and/or out of the article reservoir 28. The vent 21 can be configured to be self-sealing or can be sealed by some separate step and/or tool. The vent 21 can, for example, include a valve and can be one-way or two-way. That is, it can allow fluid to flow in both directions (in and out) or just one direction. One or more vents 21 can also be provided to allow fluid flow to or from other portions of the package 21, as desired.

The package 10 can include one or more closeable openings 30 through which one or more articles 100 may be placed into the article reservoir 28. The closeable opening 30 is preferably an unjoined portion of the sheets making up the article reservoir 28. For example, the inner sheets 12 at one end 6, 8 of the package 10 may be left unjoined across all or a portion of the width W of the package 10 to form the closeable opening 30. The closeable opening 30 may be located anywhere on the package 10 and may be configured to best meet the needs of the user. For example, if a larger opening is needed, the closeable opening 30 may be disposed along a side edge 11. Also, the closeable opening 30 may be provided through one or more of the sheets making up the package 10. At a minimum, the closeable opening 30 should provide access to the article reservoir 28 prior to being closed. This allows the user to place the one or more articles 100 in the article reservoir 28 before shipping. In an alternative execution, the article(s) 100 may be placed in the reservoir 28 prior to any of the sheets being joined together or after some, but not all of the sheets are joined together.

The closeable opening 30 may be any size desired by the user and can include any type of closure mechanism 31 or material, if a closure mechanism/material is used. For example, the closeable opening 30 may include an adhesive, mechanical closure, magnets, clips, folding closure device or any other closure mechanism desired by the user. As shown in FIG. 1, the closure mechanism 31 can be joined to package 10 at the closeable opening 30 or any other part of the package 10 or may be separate therefrom. The closure mechanism 31 may be a single-use mechanism or may be reusable. Examples of closure mechanisms include, but are not limited to hook and loop fasteners, zippers, buttons, tapes, adhesives, magnetic strips, sewing, bands, interference-type fasteners and any other types of closure mechanisms suitable for the particular use of the package 10.

Where a distinct closure mechanism 31 is not used, the closeable opening 30 may be closed by sealing the materials located in the region of the closeable opening 30. Such sealing can be done using heat, chemicals, friction, static, sound, or other sources to close the closeable opening 30. It is also possible to provide additional materials in the location of the closeable opening 30 to help provide the desire closure. For example, additional materials with different melting temperatures or strength profiles may be provided. Also, materials like particles, metals, magnets and others may be provided in the area of the closeable opening to allow for sealing of the materials with different equipment and processes. Additionally, or alternatively, the closeable opening 30 may be closed by expanding one or more of the expansion chambers 25 or 26.

The closeable opening 30 may be configured to be reusable (i.e. can be open and closed more than one time) or may be a single-use-type opening. Other features may also be included to help make the package more user-friendly. For example, the closeable opening 30 may be a different color from the rest of the package 10 or may include texture, indicia or other features to make it more readily apparent to the user. Also, the closeable opening 30 may have a sheet, coating or other material therein to help the user open the closeable opening 30 when it is time to insert the article(s) 100.

The closeable opening 30 may be configured such that it can be closed at the same time and/or with the same equipment as one or more of the expansion ports 50. For example, the package 10 can be configured such that the closeable opening can be heat seal closed at the same time one or more of the expansion ports 50 is heat seal closed. Alternatively, the closeable opening 50 can be configured to be closed at a different time than the expansion port(s) 50 and/or by different means. Thus, the article(s) 100 can be placed in the package 100 and the closeable opening 30 be closed at a time different than the expansion of the expansion chambers 24, 26. This may allow for better overall results, for example, if the article 100 must be protected from dust, but the package 10 can't be finally expanded for shipment until a time and/or location different from when and where the article 100 is placed in the package 10. In such situations, the closeable opening 30 can be closed after the article 100 is placed in the article reservoir 28 and need not wait to be closed until the expansion chambers 24, 26 are expanded for shipment.

Figure 10:
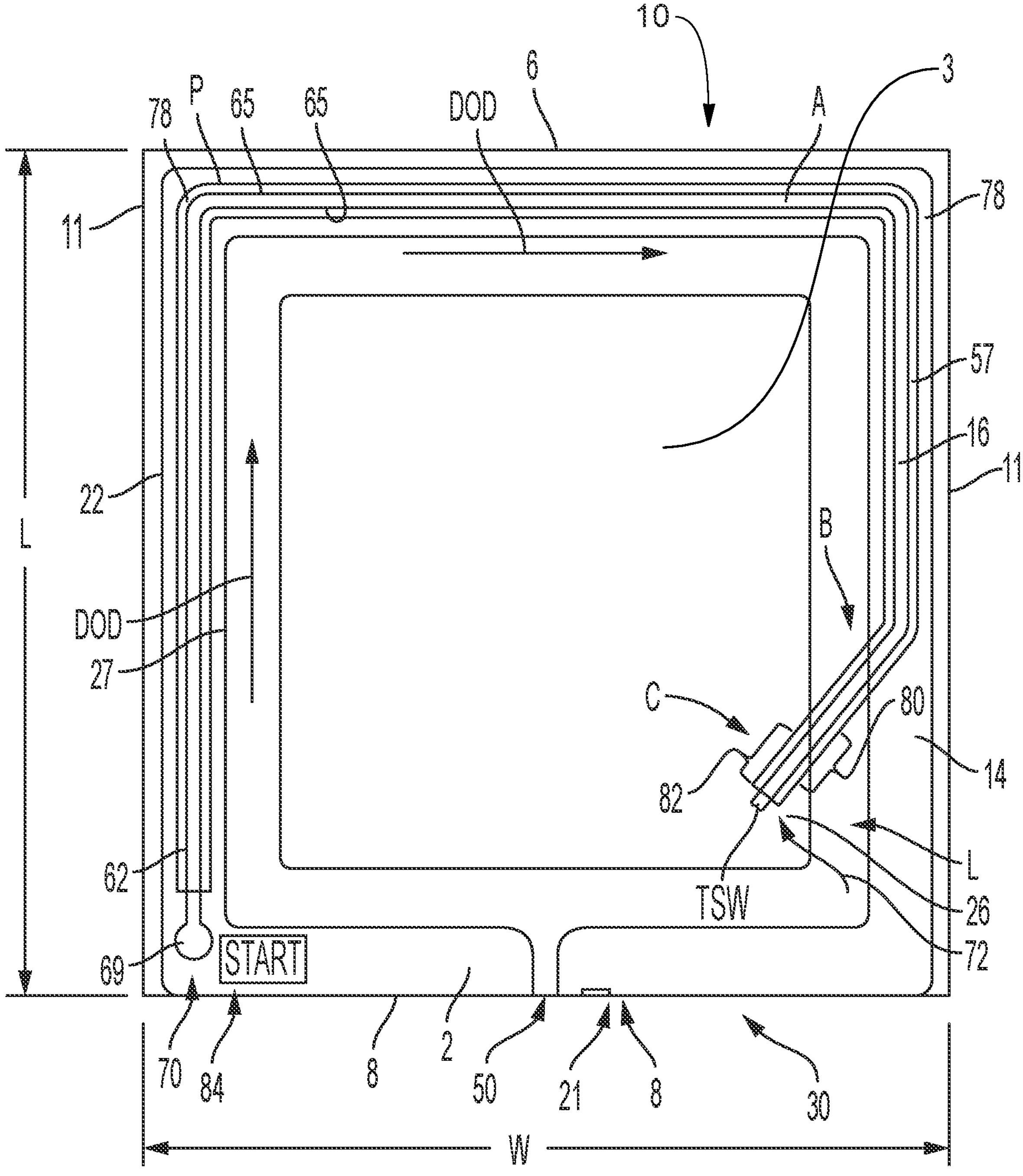
FIG. 10 is a plan view of a flexible package of the present invention in a deflated state.

The package 10 may include one or more article retrieval features 55 and/or one or more chamber deflation features 56, as shown in FIGS. 10 and 14. The article retrieval feature 55 may be used to open the package 10 so that the end user can retrieve the article(s) 100 from the article reservoir 28. The chamber deflation feature 56 may be used to deflate one or more of the primary or secondary expansion chambers 24, 26. As used here, "chamber deflation feature" is used to describe any feature that is used to deflate an expansion chamber, and can include a chamber deflation feature 56 or a combined article retrieval and chamber deflation feature 57. Examples of chamber deflation features 56 include but are not limited to tear strips; tools to puncture one or more layers of the package 10; openable closures such as, for example, screw on caps, snap on caps, adhesive closures, mechanical closures; and other closure means and mechanisms. Another example includes providing a sticker or other cover material over a hole or weakened area in one or more of the expansion chambers 24, 26 that can be removed to release the expansion material 25.

The package 10 may include any desired number of article retrieval members 55 and/or chamber deflation features 56, and they can be located anywhere on the package 10, including on an outer surface such or on a surface within the article reservoir 28. It may be desirable that there is only a single article retrieval feature 55 and only a single chamber deflation feature 56. However, there may be situations where two or more article retrieval features 55 are desired, for example, to make the package 10 easier to use and/or to allow for retrieval of articles 100 from different article reservoirs 28 or different regions of the article reservoir 28. Further, there may be situations where it is desired to have a single article retrieval feature 55 and multiple chamber deflation features 56 or vice versa. Even further, it may be desirable that a single element provides for both article retrieval and chamber deflation. Such a combined article retrieval feature and chamber deflation feature is shown in Figure and is referred to herein as a combined retrieval and deflation feature 57. One or more combined article retrieval and deflation features 57 can be combined with one or more article retrieval features and/or one or more chamber deflation features 56.

As noted, it may be desirable for the package 10 to include a combined article retrieval and chamber deflation feature 57. In such embodiments, the combined article retrieval and chamber deflation feature 57 can be operatively associated with one or more of the expansion chambers 24, 26. That is, when the package 10 is opened using the combined article retrieval and chamber deflation feature 57, one or more of the expansion chambers 24, 26 are also opened, allowing the expansion material to escape. This configuration may be preferred when the end user intends to deflate or return the package 10 to its unexpanded state once the article 10 is retrieved. As noted, the combined article retrieval and chamber deflation feature 57 can be operatively associated with one or more of the expansion chambers 24, 26 to provide for immediate or extended release of the expansion material. Further, the combined article retrieval and chamber deflation feature 57 can be configured to release the pressure or deflate one or more of the expansion chambers 24, 26 at a different time or rate than one or more of the other expansion chambers 24, 26 and/or at any time during the package opening or article retrieval process.

The article retrieval feature 55, chamber deflation feature 56, and/or combined article retrieval and chamber deflation feature 57 may comprise any element, means, structure, or the like that can be used to open the desired portion of the package and allow, for example, for the user to gain access to the article(s) 100 in the article reservoir 28, deflation of one or more expansion chambers, or both. Examples of mechanisms and devices that may be used in article retrieval features 55 include, tear strips, lines of weakness, perforations, sharp tools, and other mechanisms and devices that can be used to open the package 10 or deflate one or more of the expansion chambers, or both. However, other article retrieval features 55 are contemplated that do not require tearing or damaging of the package 10, including zippers, adhesive flaps, articulatable openings, mechanical closures, lids, caps, etc.

It may be desirable that the article retrieval feature 55, chamber deflation feature 56 and/or combined article retrieval and chamber deflation feature 57 forms part of the package 10 so that no additional tools are needed to access the article(s) in the article reservoir 28 and/or to deflate one or more of the expansion chambers. Alternatively, a tool that can be used to open the package 10 can be attached to the package 10, disposed in the package 10, made part of the package or otherwise provided for ease of opening such packages 10 or deflation of one or more expansion chambers, or both. The tool, if used, can be reusable, disposable or single use.

The article retrieval feature 55, the chamber deflation feature 56, and/or the combined article retrieval and chamber deflation feature 57 may be configured to permanently destroy the package 10 or any part thereof. For example, any one for them may, when deployed, render the package 10 unfit for re-use. This could be due to tearing of some part of the package 10 or by otherwise rendering one or more of the expansion chambers 24, 26 or the article reservoir 28 unusable. Alternatively, the article retrieval feature 55, the chamber deflation feature 56, and/or the combined article retrieval and chamber deflation feature 57 can be configured to be reusable and allow for the package 10 to be reused as a shipping package or for some other use. For example, the article retrieval feature 55, chamber deflation feature 56, and/or combined article retrieval and chamber deflation feature 57 may be configured to allow retrieval of the article(s) 100 contained in the package 10, but not deflate some or any of the expansion chambers 24, 26 so that the same article(s) 100 may be shipped again (e.g. returned) in the same package 100. Alternatively, the package 10 may be reused for shipping different articles and/or for shipping, displaying, storing or otherwise using the package for some predetermined use after one or more of the article retrieval features 55, chamber deflation features 56, and/or the combined article retrieval and chamber deflation features 57 are deployed.

The article retrieval feature 55 may be operatively associated with one or more of the primary or secondary expansion chambers 24, 26 (forming a combined article retrieval and deflation feature 57). In configurations including a chamber deflation feature 56 or a combined article retrieval and chamber deflation feature 57, it may be desirable that one or more of the expansion chambers 24, 26 is deflated before one or more other expansion chambers and/or that the expansion chambers are deflated in a particular order. This can be achieved by predetermining the path P and direction of deployment DOD along which the article retrieval feature 55 is intended to be deployed and locating the expansion chambers desired to be deflated first earlier in the path P of the article retrieval feature 55. The path P may be generally straight, may be curved and/or may change directions one or more times. It may also be desirable that any one or more of the expansion chambers be operatively associated with the article retrieval feature 55 at more than one location along the path P. This can be helpful, for example, to ensure that the chamber can be fully deflated even if the package 10 is deformed or crumpled during use or during the opening process.

As noted above, the article retrieval feature 55 may take on any suitable form, including, but not limited a tear strip 62, such as shown in FIG. 10. If a tear strip 62 or the like is used, it can be formed by providing one or more lines of weakness 65 in one or more of the materials making up the package 10 at the desired location. A line of weakness can be provided by scoring or perforating one or more of the materials or by otherwise weakening one or more of the materials continuously or intermittently along a particular line or path. Scoring, perforating and other forms of weakening can be achieved by any known or developed means and can be performed before or after the materials of the package 10 are joined together, seamed, etc. Further, a line of weakness 65 can be provided on any surface of a material, including one side of a sheet or layer, both sides, the exterior surface(s) or within one or more layer or surface(s). Examples of known means for creating lines of weakness include but are not limited to embossing; heating; etching (chemical, thermal, light, and/or mechanical); cutting or scoring using heat, light, laser, air, water, sharp edges; folding; treating with materials; joining materials that separate from each other with less force than tearing either of the materials; joining materials with a material that will separate from itself or the other materials with less force than required to tear either of the joined materials; delaminating layers of multi-layer materials in selected regions; and combinations thereof.

The tear strip 62 can be formed from the material of the package 10, from a material added to the package 10 or both. For example, a tear strip 62 can be formed by a single line of weakness 65 that separates the tear strip 62 from the remainder of the package 10 (shown in FIG. 10). Alternatively, a tear strip 62 may be formed between two lines of weakness 65 such that when deployed, the tear strip is created by the material disposed between the two lines of weakness 65 (shown in FIG. 10). Further still, a portion of or the entire tear strip 62 may include an additional material, for example a string, tape or other typically linear material, that is joined to the package 10 along the line of weakness 65 and is also joined to the material making up at least a portion of the package 10 such that when the tear strip is deployed, the additional material 67 and at least some of the material making up a portion of the package 10 is at least partially separated from the rest of the package 10 along the one or more lines of weakness 65. The additional material 67 may act as a tab to allow the user to grasp the additional material 67 easily and/or may provide strength, color, texture, visible indicia, or other desirable characteristics to the tear strip 62 or any portion thereof.

FIG. 10 is a simplified plan view of an exemplary embodiment of the package 10 of the present invention in a pre-expansion state. The package 10 has outer seams 22, side edges 11 and opposing end edges 6 and 8. The package 10 includes a combined article retrieval and chamber deflation feature 57 in the form of a tear strip 62. The tear strip 62 is formed by lines of weakness 65 that are spaced apart by the tear strip width TSW. The tear strip 62 extends along the majority of the side edges 11 and the end edge 6 of the package inboard of the outer seams 22. The tear strip 62 has a grip tab 69 disposed at one end of the tear strip 62, specifically, the originating end 70. The path P of the tear strip 62 extends from the originating end 70 to the terminating end 72. In use the tear strip 62 is intended to be deployed by taking hold of the grip tab 69 and pulling it up and away from the surface of the package 10. The tear strip 62 is then pulled along the path P in the direction of deployment DOD until the terminating end 72.

In one example, the tear strip 62 can be configured to more easily open by configuring the strength of line of weakness 65. One way to change the strength of a line of weakness 65 is to change the number or depth of perforations or scores along different portions of the line of weakness 65. Generally, the more material that is removed from the line of weakness 65, the weaker it is. This can be done by providing more apertures 90 or scores 92 per unit area, providing larger apertures 90 or scores 92 and/or providing deeper apertures 90 or scores 92. Alternatively, this can be done by scoring the material from both sides.

Another feature that can impact the performance of a tear strip 62, especially for multi-layer materials is how and where the materials are joined together. Joining materials together along some or all of the path P of the tear strip 62 can help prevent the tear strip 62 from deviating from its intended path P and can also help provide the desired tear strength and feel for the consumer. In addition, joining some layers and not others in certain regions can provide for unique characteristics when using a tear strip 62, including different depths of tear, access to different chambers within the different layers and even different tear characteristics. In certain configurations, it may be desirable or necessary to add materials in or between layers to help control the sealing. For example, additives can be used to prevent absorption of heat, light or other energy to prevent joining of materials where it is not desired to do so. Additives also or alternatively can prevent joining of materials by preventing bonding or crosslinking.

Figure 13:
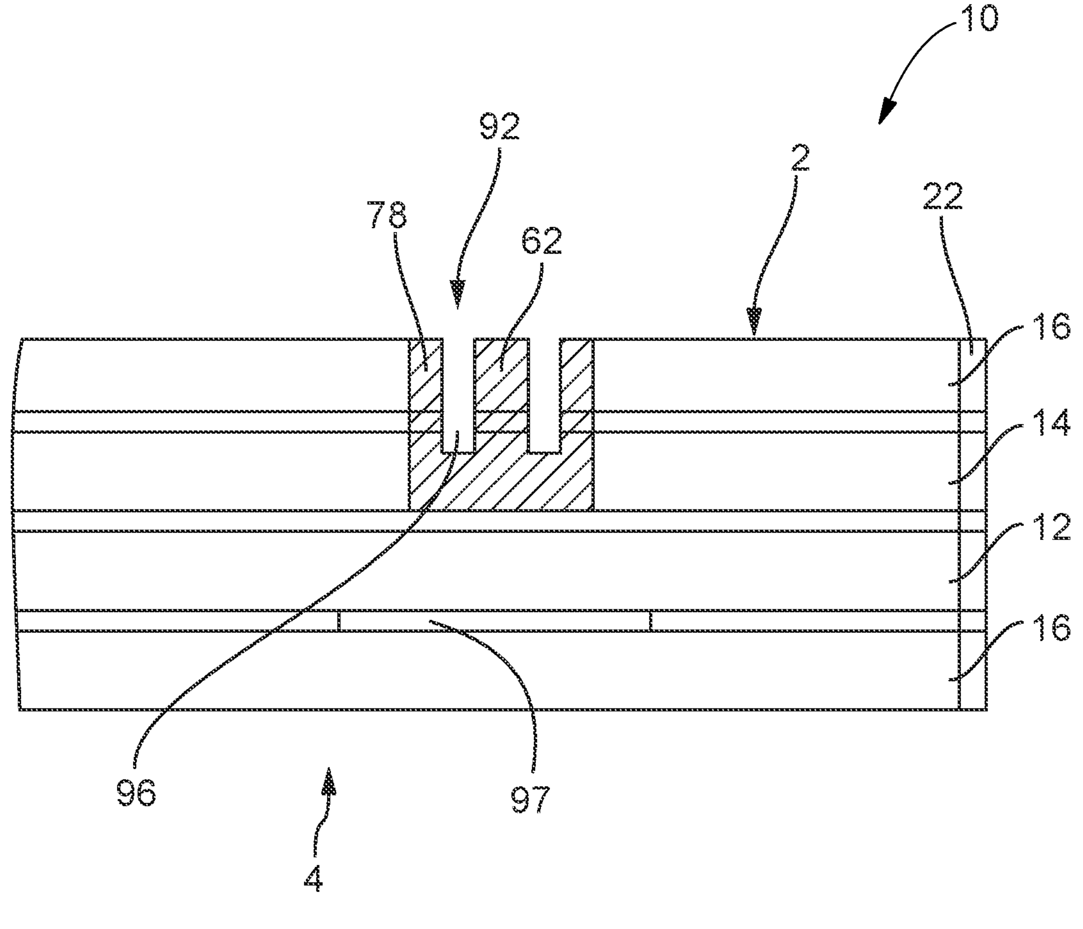
FIG. 13 is a cross-sectional view of a flexible package of the present invention.

FIG. 13 shows a cross-section view of package 10. As shown in FIG. 13, the package 10 has a tear strip 62 that extends through a primary expansion chamber release region 80 and a secondary expansion chamber release region 82. In the example shown, the tear strip 62 has a package opening portion A that is intended to provide access to the article reservoir 28, a primary expansion chamber deflation portion B that is operatively associated with and intended to deflate one or more of the primary expansion chambers 24, and a secondary expansion chamber deflation portion C that is operatively associated with and intended to deflate one or more secondary expansion chambers 26.

As shown in FIG. 13, the opening feature seam 78 configuration allows the user to pull and deploy a single opening feature, tear strip 62, to open the package 10, to deflate the primary expansion chamber(s) 24 and to deflate the secondary expansion chamber(s) 26. Further, because the tear strip 62 has a predetermined path P, starting at the originating end and finishing at the terminating end 72, this particular configuration of seams allows for deflation of the primary expansion chamber(s) 24 and the secondary expansion chamber(s) 26 at the end of the package opening process. Although the deflation is shown in FIG. 13 at the end of the package opening process, it is understood that the deflation can be moved anywhere along the seam 78. As shown in FIG. 13, package 10 has four layers of material, and the combination of the weakening features shown (cavity 96, additive 97) facilitate the ease of opening of the tear strip 62.

In the exemplary embodiment shown in FIG. 13, the line of weakness 65 is formed by forming a line of weakness 65 in material of the package 10 in the region of the opening feature seam 78. The line of weakness 65 may be formed by any means and may include one or more apertures 90, one or more scores 92, one or more cavities 96, or combinations of different types of weakening features to get to the desired properties for any particular package 10. As shown in FIG. 13, the line of weakness also can include additive 97 in the region of seam 78 to further weaken opening feature seam 78. Specifically, the additive 97 is provided underneath the line of weakness in between the layers to weaken the seam 78.

The package 10 may include a dispenser which can be configured to dispense one or more products from reservoir 28 disposed within the package 10. The dispenser may be disposed anywhere on the package 10, as desired and can take on any form such as an opening, a nozzle, a spout, a sprayer, a unit dose dispenser, a trigger dispenser or any other desired dispenser.

The package 10 can be made from a variety of materials. Such materials may include, for example and without limitation, films, woven materials, non-woven materials, paper, foil, and/or any other flexible materials. In fact, an advantage of the package 10 of the present invention is that it can be made substantially, almost entirely or entirely from flexible materials but still provide the rigidity, strength and protection needed to successfully and economically ship consumer products through established parcel and mail delivery systems. For example, the package 10 may comprise or be manufactured only of one or more film materials without the need for additional rigid interior or exterior elements, such as wood, metal, solid foam or rigid plastic or a paperboard box, to provide shape and/or structure to the package 10. Stated differently, the package 10 may consist of, or consist essentially of flexible materials. This can be advantageous for both manufactures and consumers as flexible materials such as sheets of film are often easier to handle, ship and store than more bulky items like paperboard boxes and other structural packaging members.

If films are used, the films may include, for example, polyethylene, polyester, polyethylene terephthalate, nylon, polyproplene, polyvinyl chloride, and the like. The sheets may include and/or be coated with a dissimilar material. Examples of such coatings include, without limitation, polymer coatings, metalized coatings, ceramic coatings, and/or diamond coatings. The sheets may be plastic film having a thickness such that the sheets are compliant and readily deformable by an application of force by a human. The thicknesses of the inner, secondary inner, outer and secondary outer sheets 12, 23, 14 and 16, respectively, may be approximately equivalent. Alternatively, the thicknesses of the sheets may be different.

The materials making up the sheets may be laminates that include multiple laminated layers of different types of materials to provide desired properties such as strength, flexibility, the ability to be joined, and the ability to accept printing and/or labeling. The materials, for example, may have a thickness that is less than about 200 microns (0.0078 inches). One example of a film laminate includes a tri-layer low-density polyethylene (LDPE)/Nylon/LDPE with a total thickness of 0.003 inches.

Other types of laminate structures may be suitable for use as well. For example, laminates created from co-extrusion, or coat extrusion, of multiple layers or laminates produced from adhesive lamination of different layers. Furthermore, coated paper film materials may be used. Additionally, laminating nonwoven or woven materials to film materials may be used. Other examples of structures which may be used include, but are not limited to: 48 ga polyethylene terephthalate (PET)/ink/adh/3.5 mil ethylene vinyl alcohol (EVOH)-Nylon film; 48 ga PET/Ink/adh/48 ga MET PET/adh/3 mil PE; 48 ga PET/Ink/adh/.00035 foil/adh/3 mil PE; 48 ga PET/Ink/adh/48 ga SiOx PET/adh/3 mil PE; 3.5 mil EVOH/PE film; 48 ga PET/adh/3.5 mil EVOH film; and 48 ga MET PET/adh/3 mil PE.

The sheets may be made from sustainable, bio-sourced, recycled, recyclable, and/or biodegradable materials. Non-limiting examples of renewable polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The inner layer 12 (as well as any of the others) may be made of a shrinkable material that can be shrunk or contracted when exposed to a predetermined external stimulus. For example, the inner material may be a thermoplastic film that shrinks when heated. Alternatively, the inner material 12 may shrink or contract when exposed to light, humidity, or other stimuli. Examples of shrink films include PVC shrink films and Polyolefin shrink films.

The sheets making up the package 10 may be provided in a variety of colors and designs. Additionally, materials forming the sheets may be pigmented, colored, transparent, semitransparent, or opaque. Such optical characteristics may be modified through the use of additives or masterbatch during the film making process. Any of the materials comprised in the package may be pre-printed with artwork, color, and or indicia 84 before or after forming the package blank using any printing methods, including but not limited to gravure, flexographic, screen, ink jet, laser jet, digital printing and the like. Additionally, the assembled package 10 may be printed after forming using any suitable method, including but not limited to digital, laser jet and ink-jet printing. The printing can be surface printing and/or reverse printing. Any and all surfaces of the package 10 may be printed or left unprinted. Additionally, other decoration techniques may be present on any surface of the sheets such as lenses, holograms, security features, cold foils, hot foils, embossing, metallic inks, transfer printing, varnishes, coatings, and the like. Any one or all of the sheets may include indicia such that a consumer can readily identify the nature of the product, or any given property of the product 100, held in the article reservoir 28 of the package 10, along with the brand name of the producer of the product 100 held in the package 10, the sender of the package 10, or any third-party such as a sponsor of either the producer of the product 100 or the sender of the package 10. The indicia 84 may contain decorative elements and/or may provide information or instructions on use of the product and/or package 10 or other information that may be useful, for example, to the user, shipper, recycler or other party interacting with the package.

Figure 11:
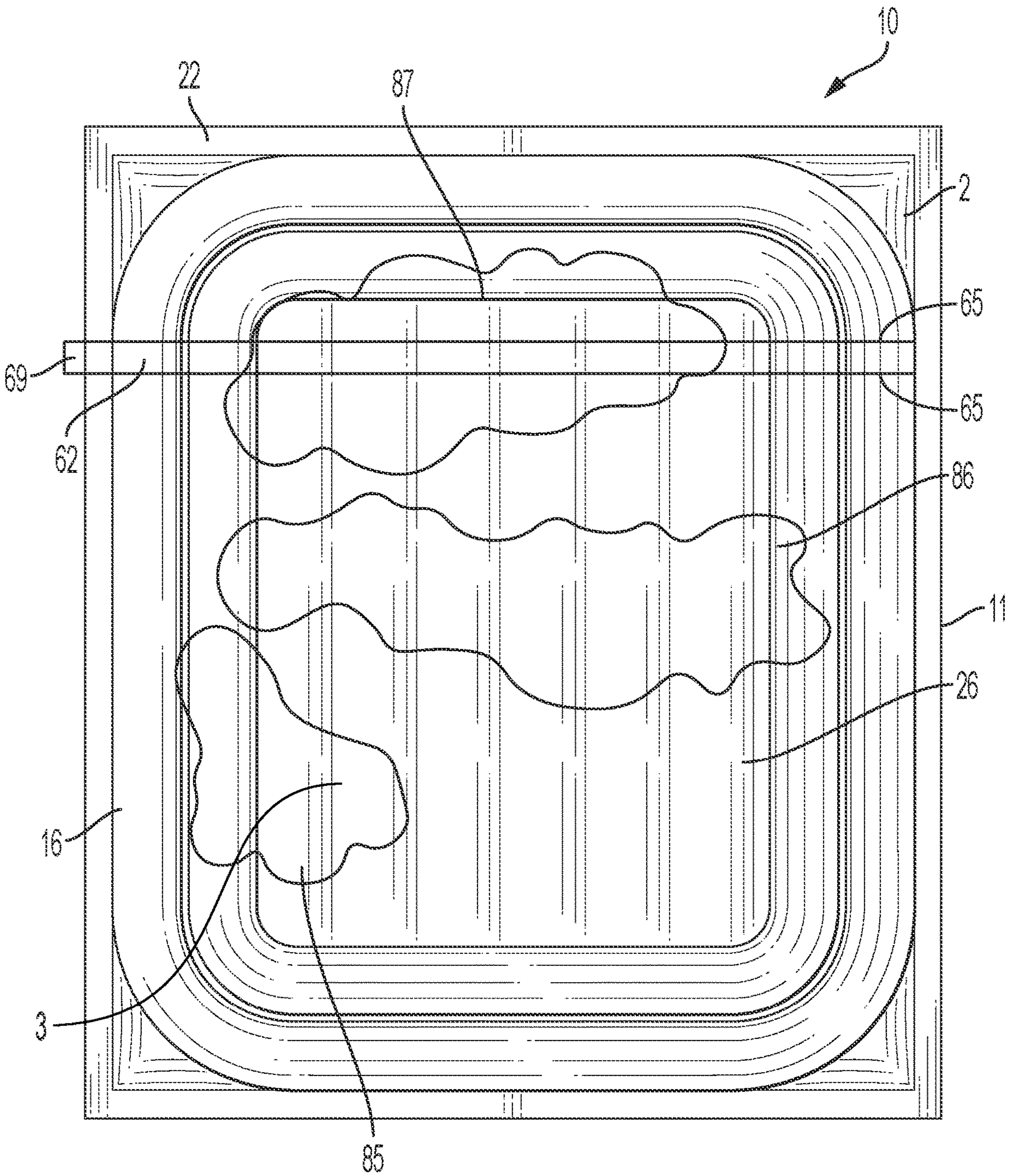
FIG. 11 is a plan view of a flexible package shown in an expanded configuration.
Figure 12:
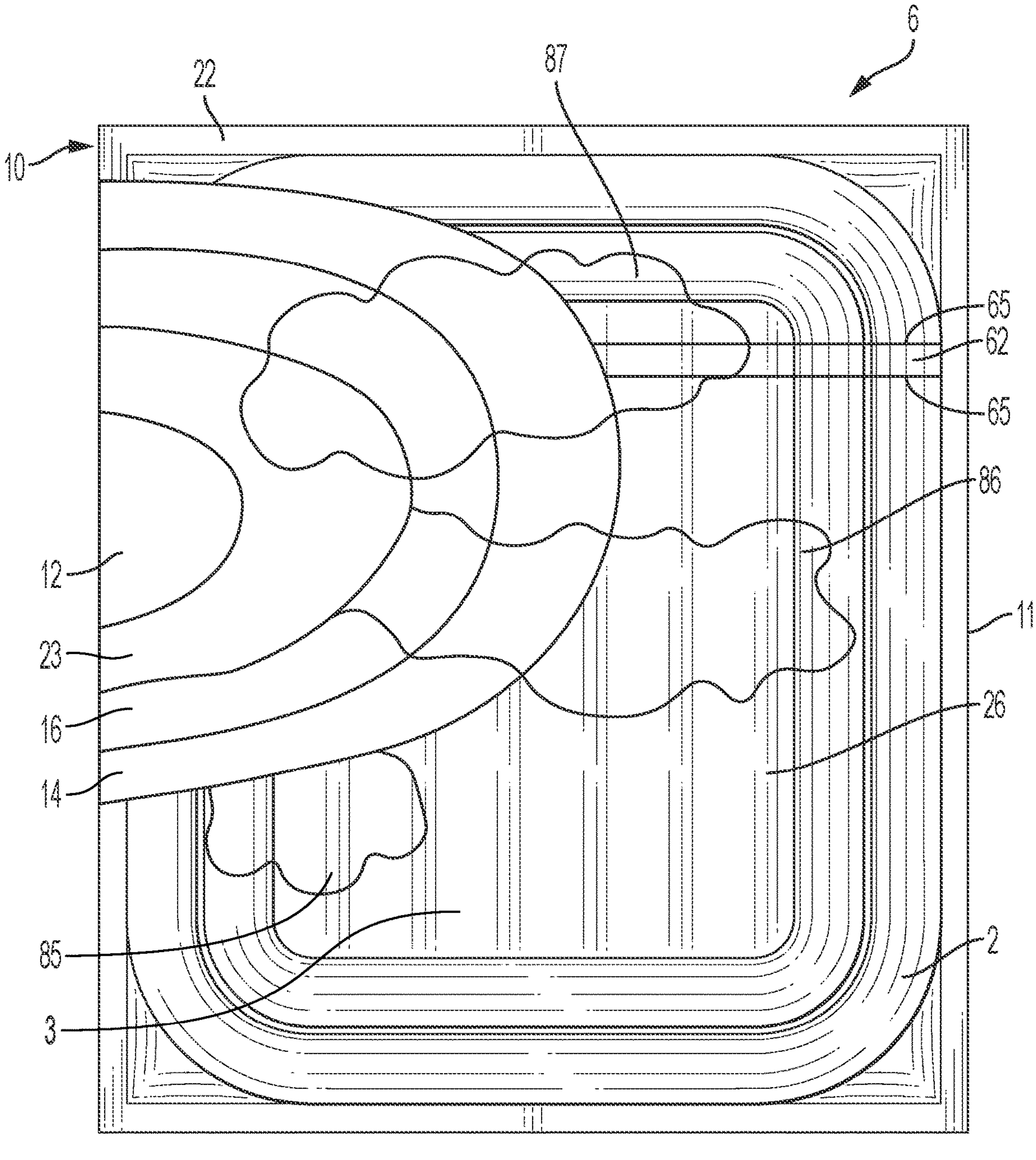
FIG. 12 is a plan view of a flexible package with portions cut away to show portions of the different sheets making up the package.

As noted, any indicia 84, printing, decoration, information or the like may be disposed on any portion of any material or materials that make up a portion of the package 10. For example, as shown in FIGS. 11 and 12, indicia 84 may be disposed on one or more of the inner sheet 12, the secondary inner sheet 23, the outer sheet 14, the secondary outer sheet 16. FIG. 11 shows indicia 85, 86 and 87 all of which are visible when viewing, for example, the top 2 of the package 10. However, as shown in FIG. 12, the secondary outer sheet indicia 85 is disposed on the secondary outer sheet 16, the outer sheet indicia 86 is disposed on the outer sheet 14 and the inner sheet indicia 87 is disposed on the inner sheet 12. Printing or otherwise providing indicia 84 on different materials, sheets or layers of the package 10 can provide for unique and aesthetically pleasing and/or interesting designs for the package 10. For example, portions of the package 10 may be translucent or transparent allowing indicia printed on different layers to be seen through the translucent or transparent regions. This can provide a three-dimensional look to the package that is not possible with paper, cardboard or other opaque materials. Further, transparent or translucent "windows" can be provided to allow printing or other indicia 84 to be seen through the window. Printing and other indicia 84 can be registered with other printing, indicia 84, portions of the package such at tear strip 62, label areas, and even the product(s) 100 disposed in the package 10 to provide functional or aesthetic features useful or desirable by shippers, manufacturers, customers and others that may interact with the package 10.

Functional inks may be printed on the sheets and functional pigments and dyes can be incorporated into one or more of the materials used to form the package 10. Functional inks, pigments and dyes include those that provide benefits beyond decoration such as, for example and without limitation, printed sensors, printed electronics, printed RFID, light-sensitive dyes, inks and pigments and those that provide texture or other utility such as UV blocking, protection from radiation or other environmental elements, etc.

Additionally, or in the alternative, labels, for example and without limitation, flexible labeling, or heat shrink sleeves may be applied to the sheets making up the packages 10 or the packages 10 themselves before or after expansion to provide the desired visual appearance of the packages 10. Because films can be printed flat and then formed into three dimensional objects, artwork can be designed to conform precisely to the package 10 itself or articles 100 therein. For example, some or all of the printing may be distorted relative to its desired finished appearance, so that the indicia 84 acquire their desired finished appearance upon being formed into three dimensional objects. Such pre-distortion printing may be useful for functional indicia 84 such as logos, diagrams, bar-codes, and other images that require precision in order to perform their intended function.

A variety of primary expansion materials 25 and/or secondary expansion materials 29 may be provided into the primary expansion chambers 24 and secondary expansion chambers 26, respectively. The primary expansion material 25 and/or secondary expansion material may be a gas, a liquid, a solid or a combination thereof. One example of a solid expansion material is a solidifying foam. Such materials can be introduced into the expansion chambers as a fluid that changes to a solid or as a solid. If a foam is used, it may be an expandable foam that increases in volume as the foam solidifies. An example of such foams includes, without limitation, a two-part liquid mixture of isocyanate and a polyol that, when combined under appropriate conditions, solidify to form a solid foam. One advantage of such an expansion material 25 is that it may be possible to use it for the intended purpose without the need to seal the expansion chamber(s), which can simplify the manufacturing and/or expansion chamber filling process. The expansion material may include a perfume, scent, color or have other consumer noticeable attributes that can provide aesthetic and/or functional benefits while enclosed within the expansion chambers or when released therefrom. For example, a scent can be included in the expansion material 25 such that when one or more of the expansion chambers is deflated, the scent is released into the air. Further, an expansion material can be used that provides UV protection, insulation or another desirable function.

The expansion material 25 may be an "expand-on-demand" material that can be expanded at any time by the user. For example, expansion of the expansion chambers 24, 26 may be caused by a phase change of a fluid introduced into the chambers. Examples of the phase change may include injecting a quantity of cooled material, for example and without limitation, liquid nitrogen or dry ice. By sealing the chamber from the external environment and allowing the expansion material to vaporize and/or sublimate when reaching an ambient temperature, pressures between the sheets may cause the expansion chambers to expand. Chemically reactive materials, for example and without limitation, a weak acid, such as citric acid, to a weak base, such as sodium bicarbonate, may be introduced into the chambers and can be activated, as desired, by the user. In such configurations, it may not be necessary to have an opening or port into which the user can introduce the expansion materials.

If chemically reactive materials are used, they can be separated from one another to allow the user to determine when to expand the expansion chambers. For example, they can be separated using a frangible seal, which may be broken to induce a reaction that causes expansion of the expansion chambers. Also, chemically reactive materials may be chosen that are non-reactive with one another at certain environmental conditions, for example at certain temperatures. When expansion of one or more of the expansion chambers is desired, the package 10 may be exposed to the environmental conditions, for example, by increasing the ambient temperature, causing the chemically reactive materials to react with one another to cause the expansion. The chemically reactive materials may be non-reactive with one another unless subject to electromagnetic energy including, for example and without limitation UV light or microwave energy. In such cases, when expansion of one or more of the expansion chambers is desired, the package 10 may be exposed to the electromagnetic energy, causing the chemically reactive materials to react with one another to cause the expansion. Such expand-on-demand expansion materials 25 may be especially desirable for situations where it is useful for the user to be able to expand the expansion chambers at any desired time and/or at a location other than the manufacturing or fulfillment location. For example, a user could purchase a package 10, take it home or to a shipping location, place article(s) 100 in the reservoir 28 and expand the expansion chamber(s).

Although the expansion material may provide any amount of expansion desired, it has been found that a pressure from about ambient pressure to about 25 psig, from about 1 psig to about 20 psig is generally suitable for packages 10 used to ship typical consumer products. Higher or lower pressures may be desired in one or all of the expansion chambers 24, 26 depending on the article(s) 100 being shipped, the method of shipment, the expected environmental conditions, such as the temperature and/or altitude to which the package 10 will be exposed.

The packages 10 of the present invention can be configured to have any desired mechanical, chemical, environmental (e.g. temperature, humidity, light, sound, dust, atmospheric pressure, precipitation, etc.), and other performance characteristics desired. For example, the packages 10 may include materials that resist penetration of humidity, water, light, certain chemicals, and/or gases. An advantage of the package 10 of the present invention is that it can be configured to meet or exceed many of the most common parcel shipping requirements, for example, as set for in industry standards like ISTA performance tests, without the need for multiple different packaging materials or difficult to construct and/or store packages. Bottom out The package 10 may be configured to endure the rigors of shipping through regions of changing ambient air pressure, such as transportation over mountains or shipment via air-cargo. Changes in ambient pressure may include increases in atmospheric pressure and decreases in atmospheric as well as changes in ambient pressure, such as in pressurized cargo holds. Transportation over high altitudes and/or shipment via air-cargo typically include a reduction in ambient air pressure. Such reductions in ambient pressure can result in an expansion chamber 24, 26 that is expanded to a pressure below its burst pressure at or near sea-level to burst during shipment. The expansion chambers 24 and 26 may be inflated sufficiently below their burst-pressure that they do not burst during shipment at reduced ambient pressure and/or may include vents or valves to allow some or all of the expansion material to escape if the expansion chamber is nearing its burst pressure.

In terms of mechanical protection, the packages 10 may be designed and configured to have properties that help protect any articles 100 shipped therein from damage due to mechanical forces, such as dropping, stacking, puncture, squeezing, tearing, pinching, etc. As with other attributes, the package 10 can be specifically designed to meet the needs of the user in terms of mechanical protection by choosing appropriate materials for different parts of the package 10, appropriately designing the shape of the package 10, appropriately expanding the one or more expansion chambers 24, 26, among other things.

One of the most important mechanical damaging forces to protect against during shipping is dropping. Often packages do not provide adequate protection for dropping because they allow the articles being shipped therein to "bottom out" when dropped. Bottoming out occurs when any protective material in the package reaches its limit of protection and thus, the article therein is subjected to the a resistance force of the surface on which it is dropped that is greater than if the package had not reached its limits of protection The packages 10 of the present invention have been found to be particularly good at resisting bottoming out of articles shipped therein, and thus, can effectively prevent breakage and other damage to the articles.

Further, the package 10 may include one or more thermally insulating material. A thermally insulating material is one that would result in an increase of the R-value as measured between the reservoir 28 and the outside of the package. In one example, one or more of the expansion chambers 24, 26 may include a thermally insulating material. Non-limiting examples of thermally insulating materials include foams and gasses with R-values greater than air, such as, for example, noble gases such as argon.

The overall shape of the package 10 may be roughly polyhedral. The overall shape of the package may be substantially a rectangular prism. Such shapes can also provide for better stacking, fit into conventional shipping equipment and handling.

One way to provide a generally parallelepiped shape is to include one or more gussets in the package 10. Gussets can help reduce the amount of material used in the package 10 and help reduce the overall size of the package 10 is to separate the top 2 and the bottom 4 from each other such that they are spaced apart when the package 10 is expanded for use. They can also help enable products of different sizes to better fit within the package 10 while maintaining its desired shape. Gussets can be formed in any suitable manner.

Packages 10 according to the present disclosure may be manufactured according to a variety of methods. For example, the package 10 may be assembled according to the method described below. Two films (secondary inner sheet 23, and inner sheet 12) are placed onto one another. A plurality of primary expansion chamber seams 20 are formed by heat sealing the inner sheet 12 and secondary inner sheet 23 in the top 2 of the package 10. Two additional films (outer sheet 14, secondary outer sheet 16) are placed onto one another and a plurality of secondary expansion chamber seams 27 are formed by heat sealing the outer sheet 14, and secondary outer sheet 16 together. The four films are then joined together by heat sealing all four films together in the region of tear strip 62. The films are folded and then sealed through all layers at outer seams 22 to form package 10. The primary expansion chamber seams 20 may be formed by a heat or other sealing operation to define the primary expansion chamber(s) 24. A plurality of secondary expansion chamber seams 27 may be formed by a heat or other sealing operation to define the secondary expansion chambers 26.

The sheets 12, 14, 23, and/or 16 may be joined by any suitable means, including using heat, glue or any of the other means and methods described herein and other known and later developed methods for joining flexible materials. A heat seal die may be used to form the seams. If so, the die is heated to the desired temperature and pressed against the films 12,14, 16, and 23 to create the seams. The sheets may be positioned relative to the heat seal die a second time to create additional expansion chambers.

Prior to heat sealing, a one-way film valve may be placed between the inner sheets and the outer sheets. The film valve spans across a location where the sheets 12, 14, 23 and/or 16 will have a seam. One-way film valves are conventionally known and are described, for example, at U.S. Pat. Pub. No. 2006/0096068. The one-way film valve may include an ink or polymer material on at least a part of the film valve that enables the film valve to be sealed into the seams created by the heat seal die, but without sealing the film valve shut.

Before or after the expansion chamber(s) 24 are formed, the ends and/or sides of the sheets may be joined to form the article reservoir 28 and the general shape of the package 10. Air, or another expansion material, may be introduced through the one-way film valve(s) to expand the expansion chamber(s) 24. Air may be introduced at any suitable pressure. For example, air may be introduced at a pressure from about 1 psig to about 20 psig to expand the chamber(s) 24 without risk of rupture of the first and second films by overpressure. Further, as noted, other expansion materials may be used and the primary expansion chambers 24 and secondary expansion chambers 26, if any, may be expanded to different pressures.

A plurality of packages 10 may be formed from larger continuous sheets of material. The packages 10 may be formed simultaneously or in series.

The packages 10 can use any and all materials, structures, and/or features for the packages 10, as well as any and all methods of making and/or using such packages 10, disclosed in the following US patents and applications: (1) U.S. Pat. No. 9,815,258 filed May 7, 2012, entitled "Film Based Packages"; (2) U.S Publication No. 2013/0292395 A1 filed May 7, 2012, entitled "Film Based Packages"; (3) U.S Publication No. 2013/0292287 A1 filed Jul. 26, 2012, entitled "Film Based Package Having a Decoration Panel"; (4) U.S. Patent application 61/727,961 filed Nov. 19, 2012, entitled "Packages Made from Flexible Material"; (5) U.S. Pat. No. 10,040,581 filed Aug. 6, 2012, entitled "Methods of Making Film Based Packages"; (6) U.S Publication No. 2013/0292413 A1 filed Mar. 13, 2013, entitled "Flexible Packages with Multiple Product Volumes"; (7) U.S. Pat. No. 9,469,088 filed Mar. 15, 2013, entitled "Flexible Materials for Flexible Containers" 61/789,135; (8) U.S. Patent Application 62/701,273 filed Jul. 20, 2018 entitled "Adsorbent Matrix as Propellant in Aerosol Package"; (9) U.S. Patent Application 62/783,535 filed Dec. 21, 2018 entitled "Shaped Flexible Shipping Package and Method of Making"; (10) U.S. Patent Application 62/810,987 filed Feb. 27, 2019 entitled "Flexible Shipping Package"; (11) U.S. Patent Application 62/838,955 filed Apr. 26, 2019 entitled "Flexible Shipping Package and Method of Making"; (12) U.S. Patent Application 62/851,224 filed May 22, 2019 entitled "Flexible Package and Method of Manufacture"; (13) U.S. Patent Application 62/851,230 filed May 22, 2019 entitled "Flexible Package and Method of Manufacture"; and (15) U.S. Patent Application 62/864,555 filed Jun. 21, 2019 entitled "Flexible Package"; each of which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While certain embodiments, variations and features have been illustrated and described herein, it should be understood that various other changes and modifications may be made without departing from the spirit and scope of the claimed subject matter. Although various aspects of the claimed subject matter have been described herein with respect to certain examples and embodiments, such aspects need not be utilized in every embodiment and/or in any particular combination. It is therefore intended that the appended claims cover all such changes and modifications that are within the scope of the claimed subject matter.

What is claimed is:

1. A package for one or more articles, the package comprising an article reservoir, a top panel having a top surface and a bottom panel having a bottom surface, and an outer seam, wherein each of the top panel and the bottom panel comprises:

- a flexible inner sheet and a flexible secondary inner sheet, the inner sheet and secondary inner sheet joined together at the outer seam and forming one or more primary expansion chambers adapted to receive a primary expansion material; and
- a flexible secondary outer sheet and an outer sheet, the secondary outer sheet and the outer sheet joined together and joined to the inner sheet and secondary inner sheet at the outer seam, and forming one or more secondary expansion chambers adapted to receive a secondary expansion material, and one or more non-expansion chambers;

wherein the one or more non-expansion chambers are provided on the top surface over the one or more primary expansion chambers.

2. The package of claim 1, wherein the one or more non-expansion chambers is a label surface.

3. The package of claim 2, wherein the one or more non-expansion chambers are provided in between the one or more secondary expansion chambers.

4. The package of claim 1, wherein the one or more secondary expansion chambers are provided along two or more sides of the top surface of the package.

5. The package of claim 4, wherein the one or more secondary expansion chambers form a frame around the perimeter of the top surface of the package.

6. The package of claim 5, wherein the one or more non-expansion chambers are provided in the region within the frame.

7. The package of claim 1, wherein the package has one or more expansion ports and the one or more primary expansion chambers and one or more secondary expansion chambers are in fluid communication with the one or more expansion ports.

8. The package of claim 1, further including an article retrieval feature that allows a user to open the package and retrieve the one or more articles from the article reservoir.

9. The package of claim 8, wherein the article retrieval feature, when activated, both opens the package and deflates the one or more primary expansion chambers and the one or more secondary expansion chambers.

10. The package of claim 1, wherein the package consists of or consists essentially of a flexible material.

11. The package of claim 1, wherein the primary expansion material and the secondary expansion material are air.

12. The package of claim 11, wherein the one or more secondary expansion chambers have an air pressure that is higher than the one or more primary expansion chambers air pressure.

13. The package of claim 12, wherein the one or more secondary expansion chambers air pressure is from 3 psig to 10 psig higher than the one or more primary expansion chambers air pressure.

14. The package of claim 12, wherein the one or more secondary expansion chambers air pressure and the one or more primary expansion chambers air pressure is higher than ambient pressure.

15. The package of claim 11, wherein the one or more non-expansion chambers is a label surface.

16. The package of claim 11, wherein one or more of the primary expansion chambers are adapted to contact the article.

* * * * *